(12) United States Patent
Turney et al.

(10) Patent No.: US 10,655,878 B2
(45) Date of Patent: May 19, 2020

(54) VARIABLE REFRIGERANT FLOW SYSTEM WITH SUB-COOLING TEMPERATURE OPTIMIZATION USING EXTREMUM-SEEKING CONTROL

(71) Applicant: Johnson Controls Technology Company, Auburn Hills, MI (US)

(72) Inventors: Robert D. Turney, Watertown, WI (US); Liming Yang, Mequon, WI (US); Yunrui Wang, Milwaukee, WI (US); Yasutaka Yoshida, Shizuoka (JP); Kazumoto Urata, Shizuoka (JP)

(73) Assignee: Johnson Controls Technology Company, Auburn Hills, MI (US)

( * ) Notice: Subject to any disclaimer, the term of this patent is extended or adjusted under 35 U.S.C. 154(b) by 92 days.

(21) Appl. No.: 16/029,255

(22) Filed: Jul. 6, 2018

(65) Prior Publication Data

US 2020/0011562 A1    Jan. 9, 2020

(51) Int. Cl.
*F24F 11/46* (2018.01)
*F24F 11/52* (2018.01)
*F24F 11/56* (2018.01)
*F24F 11/64* (2018.01)
*F24F 11/74* (2018.01)
(Continued)

(52) U.S. Cl.
CPC .............. *F24F 11/46* (2018.01); *F24F 11/52* (2018.01); *F24F 11/56* (2018.01); *F24F 11/64* (2018.01); *F24F 11/65* (2018.01); *F24F 11/74* (2018.01); *F24F 11/86* (2018.01); *G05B 13/021* (2013.01);
(Continued)

(58) Field of Classification Search
CPC .. F24F 11/46; F24F 11/74; F24F 11/64; F24F 11/86; F24F 11/65; F24F 11/56; F24F 11/52; G05B 13/021
See application file for complete search history.

(56) References Cited

U.S. PATENT DOCUMENTS

| 8,200,344 B2 | 6/2012 | Li et al. |
| 8,200,345 B2 | 6/2012 | Li et al. |

(Continued)

OTHER PUBLICATIONS

U.S. Appl. No. 15/461,222, filed Mar. 16, 2017, Johnson Control Technology Company.
(Continued)

Primary Examiner — Kenneth M Lo
Assistant Examiner — Mohammad A Rahman
(74) Attorney, Agent, or Firm — Foley & Lardner LLP

(57) ABSTRACT

A variable refrigerant flow (VRF) system for a building. The VRF system includes at least one outdoor VRF unit configured to heat or cool a refrigerant for use in heating or cooling the building. The at least one outdoor VRF unit includes a sub-cooler and a bypass expansion valve configured to control a flow of the refrigerant through the sub-cooler and an extremum-seeking controller configured to generate a sub-cooling temperature setpoint for the at least one outdoor VRF unit. The extremum-seeking controller is configured to determine a total power consumption of the at least one outdoor VRF unit, generate a sub-cooling temperature setpoint for the at least one outdoor VRF unit using an extremum-seeking control technique that drives the total power consumption toward an extremum, and use the sub-cooling temperature setpoint to operate the at least one outdoor VRF unit.

20 Claims, 12 Drawing Sheets

(51) Int. Cl.
- *F24F 11/86* (2018.01)
- *G05B 13/02* (2006.01)
- *F24F 11/65* (2018.01)
- *F24F 140/60* (2018.01)
- *F24F 140/50* (2018.01)

(52) U.S. Cl.
CPC ....... *F24F 2140/50* (2018.01); *F24F 2140/60* (2018.01)

(56) References Cited

U.S. PATENT DOCUMENTS

| | | |
|---|---|---|
| 8,666,517 B2 | 3/2014 | Li et al. |
| 8,694,132 B2 | 4/2014 | Li et al. |
| 9,835,349 B2 | 12/2017 | Salsbury et al. |
| 2011/0276182 A1* | 11/2011 | Seem ............... F25B 49/027 700/276 |
| 2016/0132027 A1 | 5/2016 | Li et al. |
| 2017/0030621 A1* | 2/2017 | Hung ................ F25B 49/02 |
| 2017/0176954 A1 | 6/2017 | Salsbury et al. |
| 2017/0241657 A1 | 8/2017 | Salsbury et al. |
| 2017/0241658 A1 | 8/2017 | Salsbury et al. |

OTHER PUBLICATIONS

U.S. Appl. No. 15/950,009, filed Apr. 10, 2018, Johnson Controls Technology Company.
U.S. Appl. No. 16/029,246, filed Jul. 6, 2018, Johnson Controls Technology Company.
U.S. Appl. No. 16/052,120, filed Aug. 1, 2018, Timothy I. Salsbury.

* cited by examiner

VARIABLE REFRIGERANT FLOW SYSTEM WITH SUB-COOLING TEMPERATURE OPTIMIZATION USING EXTREMUM-SEEKING CONTROL

BACKGROUND

The present disclosure relates generally to a variable refrigerant flow (VRF) system and more particularly to a VRF system that uses extremum-seeking control (ESC) to control the operation thereof. VRF systems may be used in heating or cooling a building Refrigerant can be either heated or cooled within outdoor VRF units and delivered to indoor VRF units within the building The refrigerant can then be returned to the outdoor VRF units to be either heated or cooled again.

ESC is a class of self-optimizing control strategies that can dynamically search for the unknown and/or time-varying inputs of a system for optimizing a certain performance index. ESC can be considered a dynamic realization of gradient searching through the use of dither signals. The gradient of the system output y with respect to the system input u can be obtained by slightly perturbing the system operation and applying a demodulation measure. Optimization of system performance can be obtained by driving the gradient towards zero by using a negative feedback loop in the closed-loop system. ESC is a non-model based control strategy, meaning that a model for the controlled system is not necessary for ESC to optimize the system.

SUMMARY

One implementation of the present disclosure is a variable refrigerant flow (VRF) system for a building. The VRF system includes at least one outdoor VRF unit configured to heat or cool a refrigerant for use in heating or cooling the building. The at least one outdoor VRF unit includes a sub-cooler and a bypass expansion valve configured to control a flow of the refrigerant through the sub-cooler and an extremum-seeking controller configured to generate a sub-cooling temperature setpoint for the at least one outdoor VRF unit. The extremum-seeking controller is configured to determine a total power consumption of the at least one outdoor VRF unit, generate a sub-cooling temperature setpoint for the at least one outdoor VRF unit using an extremum-seeking control technique that drives the total power consumption toward an extremum, and use the sub-cooling temperature setpoint to operate the at least one outdoor VRF unit.

In some embodiments, generating a sub-cooling temperature setpoint for the at least one outdoor VRF unit using an extremum-seeking control technique includes perturbing a current value of the sub-cooling temperature setpoint with an excitation signal, monitoring the total power consumption resulting from the perturbed current value of the sub-cooling temperature setpoint, estimating a gradient of the total power consumption with respect to the perturbed current value of the sub-cooling temperature setpoint, and determining a new value of the sub-cooling temperature setpoint to drive the estimated gradient toward zero.

In some embodiments, the total power consumption includes a combination of a compressor power and a fan power for the at least one outdoor VRF unit.

In some embodiments, the at least one outdoor VRF unit is configured to deliver the refrigerant to a plurality of indoor VRF units located within the building.

In some embodiments, the sub-cooling temperature setpoint is a setpoint temperature for the portion of the refrigerant that is cooled in the sub-cooler at an outlet of the sub-cooler.

In some embodiments, the sub-cooling temperature setpoint is a setpoint temperature difference between a temperature of the portion of the refrigerant that is cooled in the sub-cooler at an outlet of the sub-cooler and a saturation temperature of the portion of the refrigerant that is cooled in the sub-cooler at an outlet of the sub-cooler.

In some embodiments, the sub-cooler includes a first flow path and a second flow path configured to pass through a heat exchanger, a bypass line configured to branch off of the first flow path and provide refrigerant to the second flow pat, and the bypass expansion valve located between the bypass line and the second flow path configured to control the flow from the bypass line into the second flow path.

In some embodiments, the heat exchanger of the sub-cooler is configured to transfer heat from the portion of the refrigerant in the first flow path to the portion of the refrigerant in the second flow path.

Another implementation of the present disclosure is a method for operating a variable refrigerant flow (VRF) system for a building. The method includes determining a total power consumption of at least one outdoor VRF unit, generating a sub-cooling temperature setpoint for the at least one outdoor VRF unit using an extremum-seeking control technique that drives the total power consumption toward an extremum, and using the sub-cooling temperature setpoint to operate the at least one outdoor VRF unit.

In some embodiments, generating the sub-cooling temperature setpoint for the at least one outdoor VRF unit using the extremum-seeking control technique includes perturbing a current value of the sub-cooling temperature setpoint with an excitation signal, monitoring the total power consumption resulting from the perturbed current value of the sub-cooling temperature setpoint, estimating a gradient of the total power consumption with respect to the perturbed current value of the sub-cooling temperature setpoint, and determining a new value of the sub-cooling temperature setpoint to drive the estimated gradient toward zero.

In some embodiments, the at least one outdoor VRF unit includes a compressor and a fan. In some embodiments, determining the total power consumption of the at least one outdoor VRF unit includes combining a power consumption of the compressor and a power consumption of the fan for at least one of outdoor VRF units.

In some embodiments, the method includes operating the at least one outdoor VRF unit to heat or cool a refrigerant and delivering the refrigerant to a plurality of indoor VRF units located within the building.

In some embodiments, the method includes setting the sub-cooling temperature setpoint to a setpoint temperature for the portion of the refrigerant that is cooled in a sub-cooler at an outlet of the sub-cooler.

In some embodiments, the method includes setting the sub-cooling temperature setpoint to a setpoint temperature difference between a temperature of the portion of the refrigerant that is cooled in the sub-cooler at an outlet of the sub-cooler and a saturation temperature of the portion of the refrigerant that is cooled in the sub-cooler at an outlet of the sub-cooler.

In some embodiments, the sub-cooler includes a first flow path, a second flow path, a heat exchanger, a bypass line, and a bypass expansion valve. The method includes directing refrigerant through the first flow path and the second flow path to pass through the heat exchanger, branching the bypass line off of the first flow path to provide refrigerant to the second flow path, and controlling the bypass expansion valve located between the bypass line and the second flow path to control the flow from the bypass line into the second flow path.

In some embodiments, the method includes transferring heat from the portion of the refrigerant in the first flow path to the portion of the refrigerant in the second flow path.

Another implementation of the present disclosure is an extremum-seeking controller for a variable refrigerant flow (VRF) system. The extremum-seeking controller includes one or more interfaces configured to provide control signals to the VRF system, and a processing circuit. The processing circuit is configured to drive a total power consumption toward an extremum by perturbing a current value of the sub-cooling temperature setpoint with an excitation signal, monitoring the total power consumption resulting from the perturbed current value of the sub-cooling temperature setpoint, estimating a gradient of the total power consumption with respect to the perturbed current value of the sub-cooling temperature setpoint, and determining a new value of the sub-cooling temperature setpoint to drive the estimated gradient toward zero.

In some embodiments, perturbing the current value of the sub-cooling temperature setpoint with an excitation signal includes adding a dither signal.

In some embodiments, monitoring the total power consumption resulting from the perturbed current value of the sub-cooling temperature setpoint includes combining a power consumption of a compressor and a power consumption of a fan for at least one outdoor VRF units.

In some embodiments, the one or more interfaces are further configured to receive data from the VRF system.

DETAILED DESCRIPTION

Variable Refrigerant Flow System

Figure 1A:
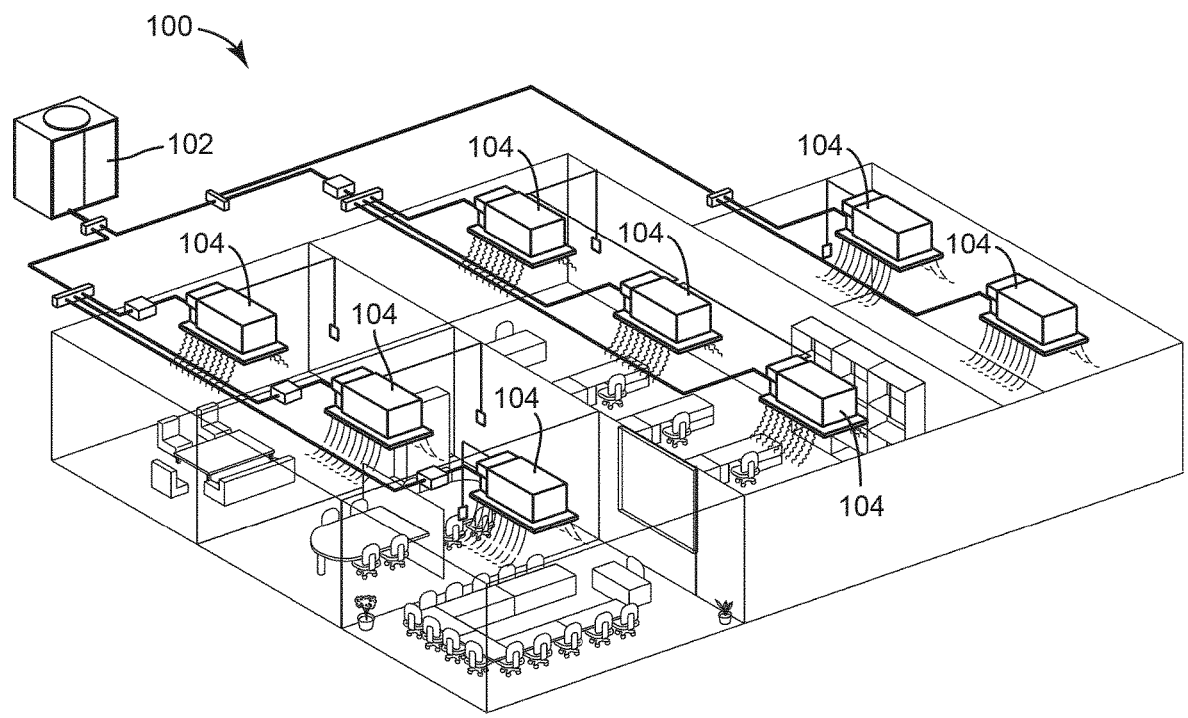
FIGS. 1A-1B are drawings of a variable refrigerant flow (VRF) system having one or more outdoor VRF units and a plurality of indoor VRF units, according to some embodiments.
Figure 1B:
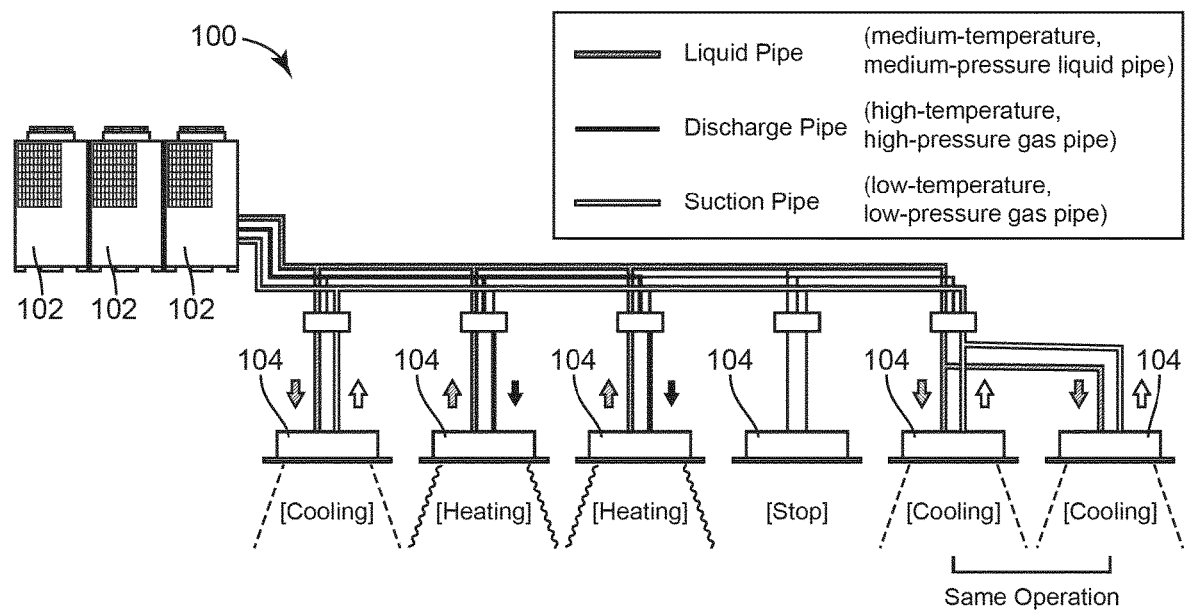

Referring now to FIGS. 1A-1B, a variable refrigerant flow (VRF) system 100 is shown, according to some embodiments. VRF system 100 is shown to include a plurality of outdoor VRF units 102 and a plurality of indoor VRF units 104. Outdoor VRF units 102 can be located outside a building and can operate to heat or cool a refrigerant. Outdoor VRF units 102 can consume electricity to convert refrigerant between liquid, gas, and/or super-heated gas phases. Indoor VRF units 104 can be distributed throughout various building zones within a building and can receive the heated or cooled refrigerant from outdoor VRF units 102. Each indoor VRF unit 104 can provide temperature control for the particular building zone in which the indoor VRF unit 104 is located.

A primary advantage of VRF systems is that some indoor VRF units 104 can operate in a cooling mode while other indoor VRF units 104 operate in a heating mode. For example, each of outdoor VRF units 102 and indoor VRF units 104 can operate in a heating mode, a cooling mode, or an off mode. Each building zone can be controlled independently and can have different temperature setpoints. In some embodiments, each building has up to three outdoor VRF units 102 located outside the building (e.g., on a rooftop) and up to 128 indoor VRF units 104 distributed throughout the building (e.g., in various building zones).

Many different configurations exist for VRF system 100. In some embodiments, VRF system 100 is a two-pipe system in which each outdoor VRF unit 102 connects to a single refrigerant return line and a single refrigerant outlet line. In a two-pipe system, all of the outdoor VRF units 102 operate in the same mode since only one of a heated or chilled refrigerant can be provided via the single refrigerant outlet line. In other embodiments, VRF system 100 is a three-pipe system in which each outdoor VRF unit 102 connects to a refrigerant return line, a hot refrigerant outlet line, and a cold refrigerant outlet line. In a three-pipe system, both heating and cooling can be provided simultaneously via the dual refrigerant outlet lines.

Figure 2:
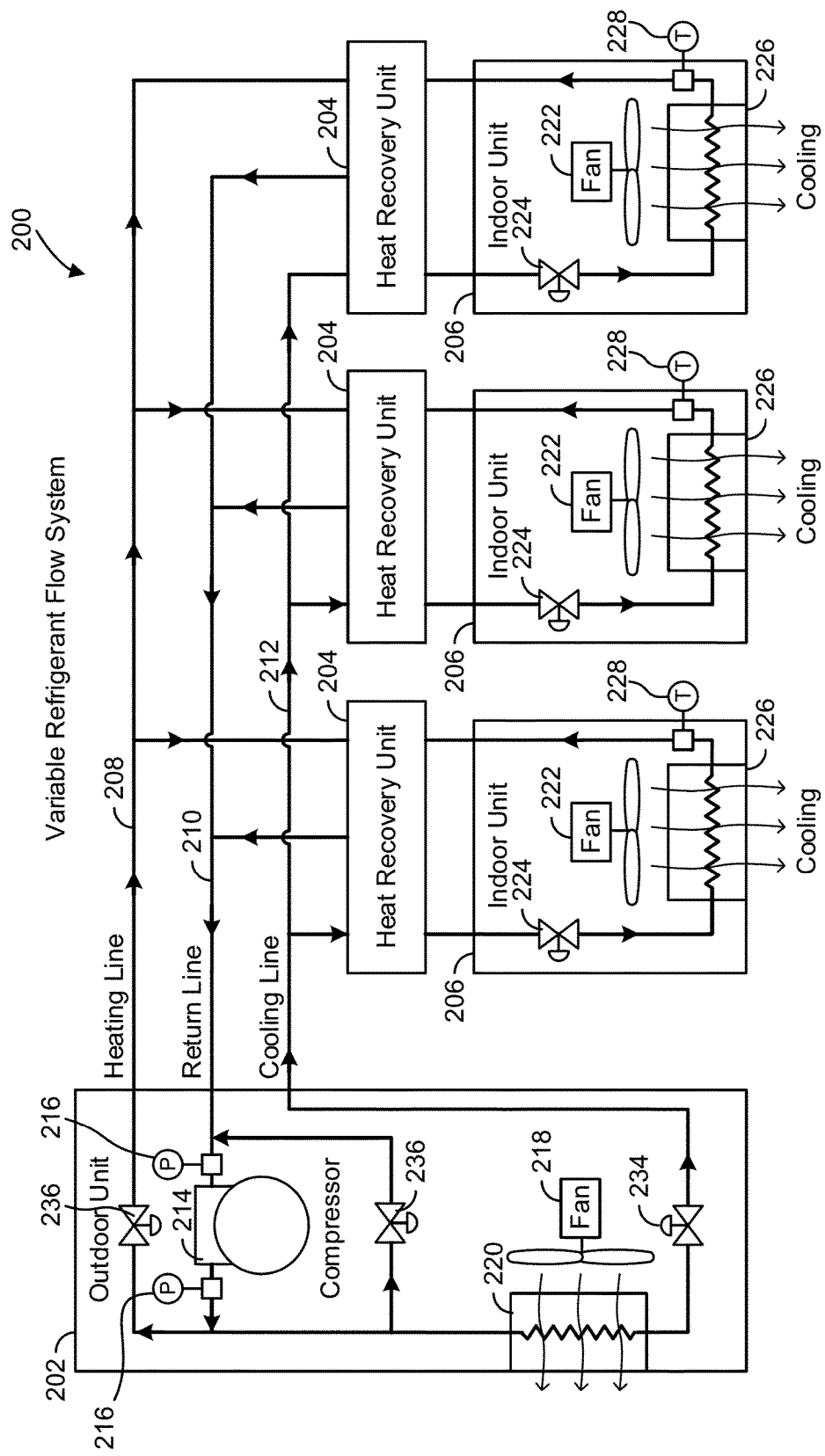
FIG. 2 is a block diagram of a VRF system in which the systems and methods of the present disclosure can be implemented, according to some embodiments.

Referring now to FIG. 2, a VRF system 200 is shown, according to some embodiments. VRF system 200 is shown to include an outdoor unit 202, several heat recovery units 204, and several indoor units 206. In some embodiments, outdoor unit 202 is located outside a building (e.g., on a rooftop) whereas indoor units 206 are distributed throughout the building (e.g., in various rooms or zones of the building). In some embodiments, VRF system 200 includes several heat recovery units 204. Heat recovery units 204 can control the flow of a refrigerant between outdoor unit 204 and indoor units 206 (e.g., by opening or closing valves) and can minimize the heating or cooling load to be served by outdoor unit 202.

Outdoor unit 202 is shown to include a compressor 214 and a heat exchanger 220. Compressor 214 circulates a refrigerant between heat exchanger 220 and indoor units 206. Heat exchanger 220 can function as a condenser (allowing the refrigerant to reject heat to the outside air) when VRF system 200 operates in a cooling mode or as an evaporator (allowing the refrigerant to absorb heat from the outside air) when VRF system 200 operates in a heating mode. A fan 218 provides airflow through heat exchanger 220. The speed of fan 218 can be adjusted to modulate the rate of heat transfer into or out of the refrigerant in heat exchanger 220.

Each indoor unit 206 is shown to include a heat exchanger 226 and an expansion valve 224. Each of heat exchangers 226 can function as a condenser (allowing the refrigerant to reject heat to the air within the room or zone) when the indoor unit 206 operates in a heating mode or as an evaporator (allowing the refrigerant to absorb heat from the air within the room or zone) when the indoor unit 206 operates in a cooling mode. Fans 222 provide airflow through heat exchangers 226. The speeds of fans 222 can be adjusted to modulate the rate of heat transfer into or out of the refrigerant in heat exchangers 226. Temperature sensors 228 can be used to measure the temperature of the refrigerant within indoor units 206.

In FIG. 2, indoor units 206 are shown operating in the cooling mode. In the cooling mode, the refrigerant is provided to indoor units 206 via cooling line 212. The refrigerant is expanded by expansion valves 224 to a cold, low pressure state and flows through heat exchangers 226 (functioning as evaporators) to absorb heat from the room or zone within the building. The heated refrigerant then flows back to outdoor unit 202 via return line 210 and is compressed by compressor 214 to a hot, high pressure state. The compressed refrigerant flows through heat exchanger 220 (functioning as a condenser) and rejects heat to the outside air. The cooled refrigerant can then be provided back to indoor units 206 via cooling line 212. In the cooling mode, flow control valves 236 can be closed and expansion valve 234 can be completely open.

In the heating mode, the refrigerant is provided to indoor units 206 in a hot state via heating line 208. The hot refrigerant flows through heat exchangers 226 (functioning as condensers) and rejects heat to the air within the room or zone of the building. The refrigerant then flows back to outdoor unit via cooling line 212 (opposite the flow direction shown in FIG. 2). The refrigerant can be expanded by expansion valve 234 to a colder, lower pressure state. The expanded refrigerant flows through heat exchanger 220 (functioning as an evaporator) and absorbs heat from the outside air. The heated refrigerant can be compressed by compressor 214 and provided back to indoor units 206 via heating line 208 in a hot, compressed state. In the heating mode, flow control valves 236 can be completely open to allow the refrigerant from compressor 214 to flow into heating line 208.

Extremum-Seeking Control Systems

Figure 3:
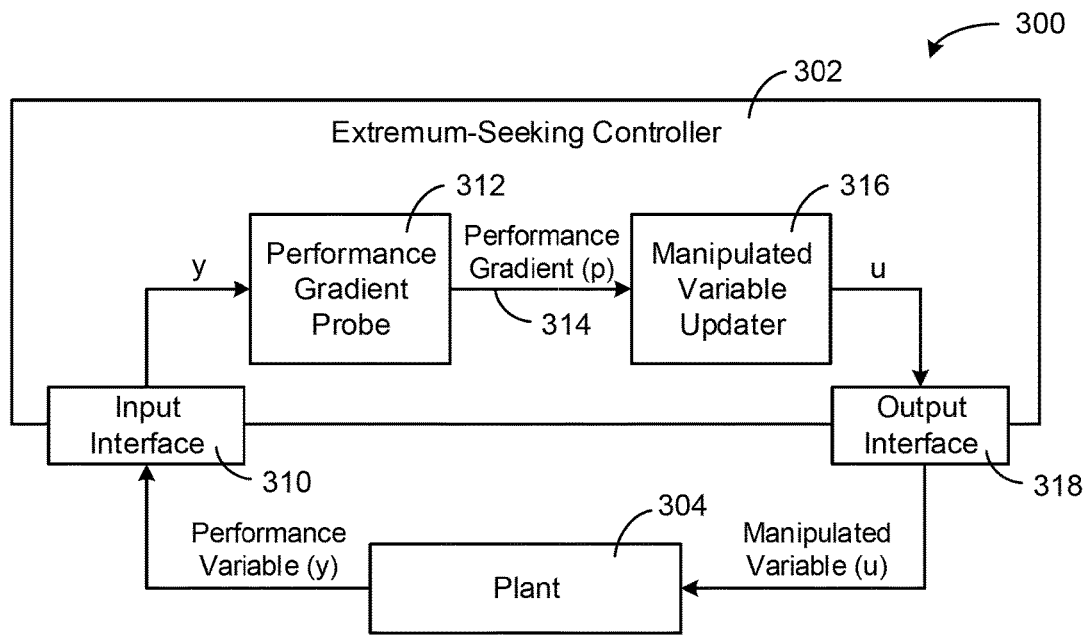
FIG. 3 is a block diagram of an extremum-seeking control (ESC) system which uses a dither signal to perturb a control input provided to a plant, according to some embodiments.

Referring now to FIG. 3, a block diagram of an extremum-seeking control (ESC) system 300 is shown, according to some embodiments. ESC system 300 is shown to include an extremum-seeking controller 302 and a plant 304. A plant in control theory is the combination of a process and one or more mechanically-controlled outputs. For example, plant 304 can be an air handling unit configured to control temperature within a building space via one or more mechanically-controlled actuators and/or dampers. In various embodiments, plant 304 can include a chiller operation process, a damper adjustment process, a mechanical cooling process, a ventilation process, a refrigeration process, or any other process in which an input variable to plant 304 (i.e., manipulated variable u) is adjusted to affect an output from plant 304 (i.e., performance variable y).

Extremum-seeking controller 302 uses extremum-seeking control logic to modulate the manipulated variable u. For example, controller 302 may use a periodic (e.g., sinusoidal) perturbation signal or dither signal to perturb the value of manipulated variable u in order to extract a performance gradient p. The manipulated variable u can be perturbed by adding periodic oscillations to a DC value of the performance variable u, which may be determined by a feedback control loop. The performance gradient p represents the gradient or slope of the performance variable y with respect to the manipulated variable u. Controller 302 uses extremum-seeking control logic to determine a value for the manipulated variable u that drives the performance gradient p to zero.

Controller 302 may determine the DC value of manipulated variable u based on a measurement or other indication of the performance variable y received as feedback from plant 304 via input interface 310. Measurements from plant 304 can include, but are not limited to, information received from sensors about the state of plant 304 or control signals sent to other devices in the system. In some embodiments, the performance variable y is a measured or calculated amount of power consumption, a fan speed, a damper position, a temperature, or any other variable that can be measured or calculated by plant 304. Performance variable y can be the variable that extremum-seeking controller 302 seeks to optimize via an extremum-seeking control technique. Performance variable y can be output by plant 304 or observed at plant 304 (e.g., via a sensor) and provided to extremum-seeking controller at input interface 310.

Input interface 310 provides the performance variable y to performance gradient probe 612 to detect the performance gradient 314. Performance gradient 314 may indicate a slope of the function y=f(u), where y represents the performance variable received from plant 304 and u represents the manipulated variable provided to plant 304. When performance gradient 314 is zero, the performance variable y has an extremum value (e.g., a maximum or minimum). Therefore, extremum-seeking controller 302 can optimize the value of the performance variable y by driving performance gradient 314 to zero.

Manipulated variable updater 316 produces an updated manipulated variable u based upon performance gradient 314. In some embodiments, manipulated variable updater 316 includes an integrator to drive performance gradient 314 to zero. Manipulated variable updater 316 then provides an updated manipulated variable u to plant 304 via output interface 318.

Figure 4:
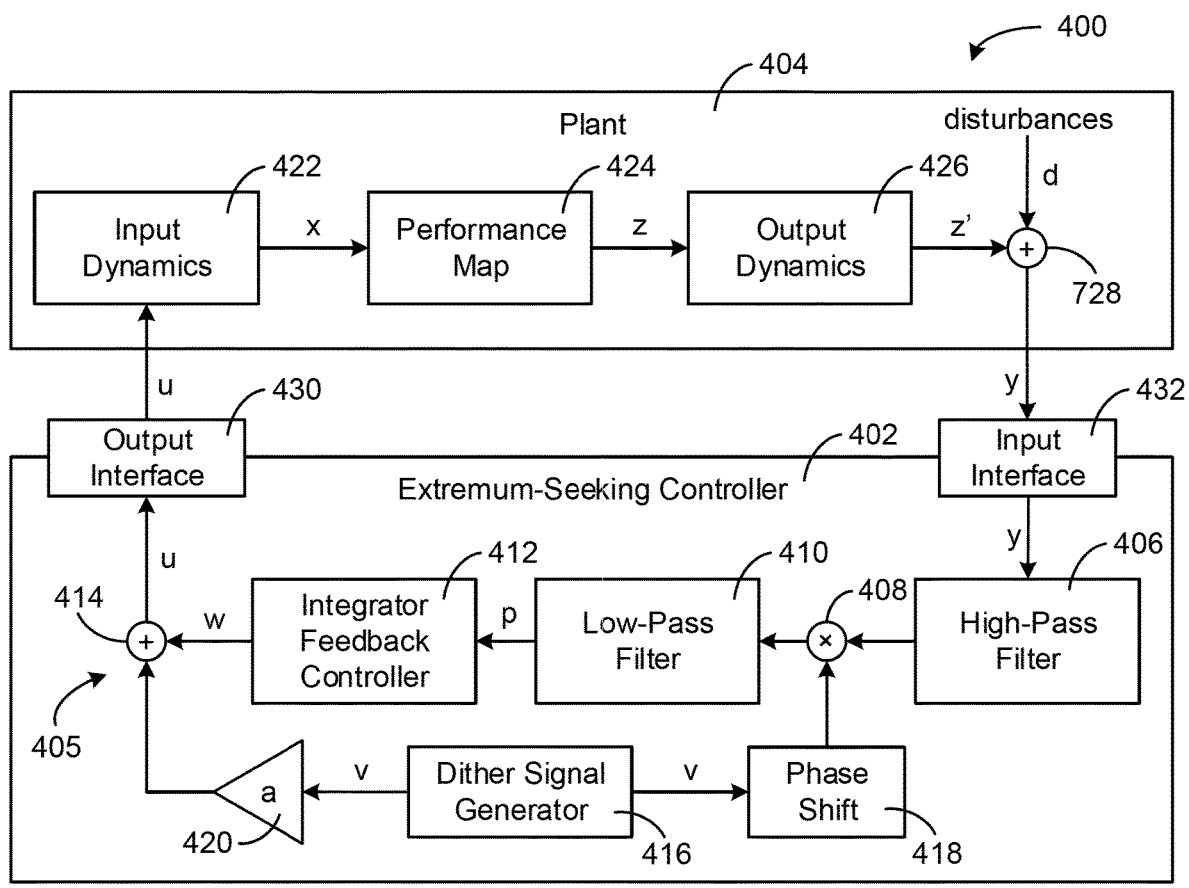
FIG. 4 is a block diagram of another ESC system which uses a dither signal to perturb a control input provided to a plant, according to some embodiments.

Referring now to FIG. 4, a block diagram of another ESC system 400 is shown, according to some embodiments. ESC system 400 is shown to include a plant 404 and an extremum-seeking controller 402. Controller 402 uses an extremum-seeking control strategy to optimize a performance variable y received as an output from plant 404. Optimizing performance variable y can include minimizing y, maximizing y, controlling y to achieve a setpoint, or otherwise regulating the value of performance variable y.

Plant 404 can be the same as plant 304 or similar to plant 304, as described with reference to FIG. 3. For example, plant 404 can be a combination of a process and one or more mechanically-controlled outputs. In some embodiments, plant 404 is an air handling unit configured to control temperature within a building space via one or more mechanically-controlled actuators and/or dampers. In other embodiments, plant 404 can include a chiller operation process, a damper adjustment process, a mechanical cooling process, a ventilation process, or any other process that generates an output based on one or more control inputs.

Plant 404 can be represented mathematically as a combination of input dynamics 422, a performance map 424, output dynamics 426, and disturbances d. In some embodiments, input dynamics 422 are linear time-invariant (LTI) input dynamics and output dynamics 426 are LTI output dynamics. Performance map 424 can be a static nonlinear performance map. Disturbances d can include process noise, measurement noise, or a combination of both. Although the components of plant 404 are shown in FIG. 4, it should be noted that the actual mathematical model for plant 404 does not need to be known in order to apply ESC.

Plant 404 receives a control input u (e.g., a control signal, a manipulated variable, etc.) from extremum-seeking controller 402 via output interface 430. Input dynamics 422 may use the control input u to generate a function signal x based on the control input (e.g., x=f(u)). Function signal x may be passed to performance map 424 which generates an output signal z as a function of the function signal (i.e., z=f(x)). The output signal z may be passed through output dynamics 426 to produce signal z', which is modified by disturbances d at element 428 to produce performance variable y (e.g., y=z'+d). Performance variable y is provided as an output from plant 404 and received at extremum-seeking controller 402. Extremum-seeking controller 402 may seek to find values for x and/or u that optimize the output z of performance map 424 and/or the performance variable y.

Still referring to FIG. 4, extremum-seeking controller 402 is shown receiving performance variable y via input interface 432 and providing performance variable y to a control loop 405 within controller 402. Control loop 405 is shown to include a high-pass filter 406, a demodulation element 408, a low-pass filter 410, an integrator feedback controller 412, and a dither signal element 414. Control loop 405 may be configured to extract a performance gradient p from performance variable y using a dither-demodulation technique. Integrator feedback controller 412 analyzes the performance gradient p and adjusts the DC value of the plant input (i.e., the variable w) to drive performance gradient p to zero.

The first step of the dither-demodulation technique is performed by dither signal generator 416 and dither signal element 414. Dither signal generator 416 generates a periodic dither signal v, which is typically a sinusoidal signal. Dither signal element 414 receives the dither signal v from dither signal generator 416 and the DC value of the plant input w from controller 412. Dither signal element 414 combines dither signal v with the DC value of the plant input w to generate the perturbed control input u provided to plant 404 (e.g., u=w+v). The perturbed control input u is provided to plant 404 and used by plant 404 to generate performance variable y as previously described.

The second step of the dither-demodulation technique is performed by high-pass filter 406, demodulation element 408, and low-pass filter 410. High-pass filter 406 filters the performance variable y and provides the filtered output to demodulation element 408. Demodulation element 408 demodulates the output of high-pass filter 406 by multiplying the filtered output by the dither signal v with a phase shift 418 applied. The DC value of this multiplication is proportional to the performance gradient p of performance variable y with respect to the control input u. The output of demodulation element 408 is provided to low-pass filter 410, which extracts the performance gradient p (i.e., the DC value of the demodulated output). The estimate of the performance gradient p is then provided to integrator feedback controller 412, which drives the performance gradient estimate p to zero by adjusting the DC value w of the plant input u.

Still referring to FIG. 4, extremum-seeking controller 402 is shown to include an amplifier 420. It may be desirable to amplify the dither signal v such that the amplitude of the dither signal v is large enough for the effects of dither signal v to be evident in the plant output y. Additionally, it may be desirable to carefully select the frequency of the dither signal v to ensure that the ESC strategy is effective. For example, it may be desirable to select a dither signal frequency $\omega_v$ based on the natural frequency $\omega_n$ of plant 404 to enhance the effect of the dither signal v on the performance variable y.

In ESC system 400, the output of high-pass filter 406 can be represented as the difference between the value of the performance variable y and the expected value of the performance variable y, as shown in the following equation:

Output of High-Pass Filter: $y-E[y]$ where the variable E[y] is the expected value of the performance variable y. The result of the cross-correlation performed by demodulation element 408 (i.e., the output of demodulation element 408) can be represented as the product of the high-pass filter output and the phase-shifted dither signal, as shown in the following equation:

Result of Cross-Correlation: $(y-E[y])(v-E[v])$ where the variable E[v] is the expected value of the dither signal v. The output of low-pass filter 410 can be represented as the covariance of the dither signal v and the performance variable y, as shown in the following equation:

Output of Low-Pass Filter: $E[(y-E[y])(v-E[u])]=\text{Cov}(v,y)$ where the variable E[u] is the expected value of the control input u.

The preceding equations show that ESC system 400 generates an estimate for the covariance Cov(v,y) between the dither signal v and the plant output (i.e., the performance variable y). The covariance Cov(v,y) can be used in ESC system 400 as a proxy for the performance gradient p. For example, the covariance Cov(v,y) can be calculated by high-pass filter 406, demodulation element 408, and low-pass filter 410 and provided as a feedback input to integrator feedback controller 412. Integrator feedback controller 412 can adjust the DC value w of the plant input u in order to minimize the covariance Cov(v,y) as part of the feedback control loop.

Variable Refrigerant Flow System with Sub-Cooling Temperature Optimization

Figure 5:
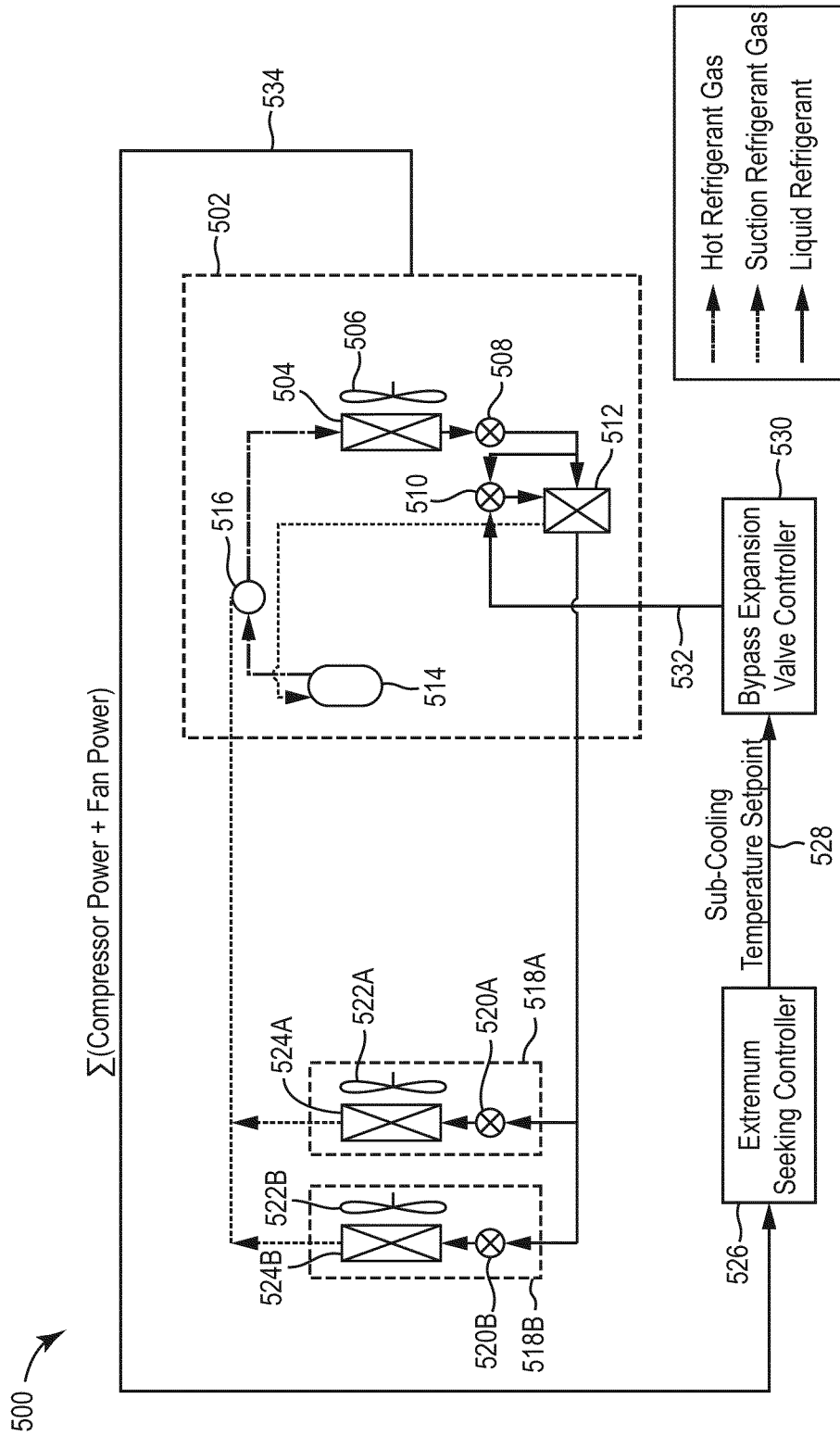
FIG. 5 is a schematic of a VRF system in a cooling configuration, according to some embodiments.
Figure 6:
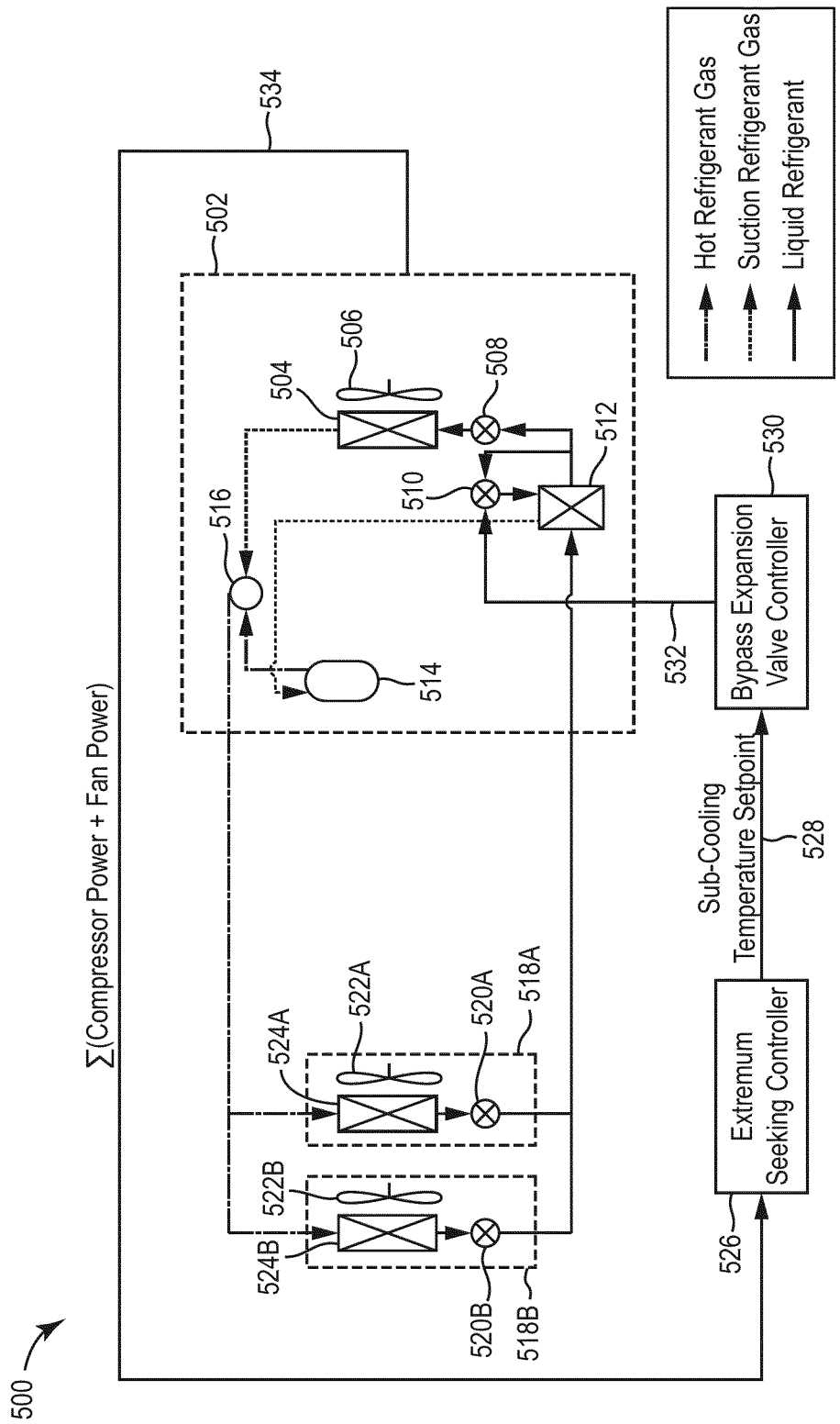
FIG. 6 is a schematic of the VRF system of FIG. 5 in a heating configuration, according to some embodiments.

Referring now to FIGS. 5-6, a variable refrigerant flow (VRF) system 500 is shown, according to some embodiments. FIG. 5 illustrates the operation of VRF system 1000 in a cooling mode, whereas FIG. 6 illustrates the operation of VRF system 1000 in a heating mode. VRF system 1000 can be configured to cool a building by cooling a refrigerant with an outdoor VRF unit 502 and delivering the refrigerant to a plurality of indoor units 518A-518B. VRF system 500 can be configured to heat a building by heating a refrigerant with outdoor VRF unit 502 and deliver the refrigerant to indoor units 518A-518B. Although only one outdoor VRF unit 502 and two indoor VRF units 518A-518B are shown in FIGS. 5-6, it should be understood that VRF system 500 may include more than one outdoor VRF unit 502 and more than two indoor VRF units 518A-518B in various exemplary embodiments.

Outdoor VRF unit 502 is shown to include a heat exchanger 504, an outdoor fan 506, an expansion valve 508, a bypass expansion valve 510, a sub-cooling heat exchanger 512, a compressor 514, and a junction 516. Indoor VRF units 518A-518B are shown to include an expansion valve 520A-520B, a heat exchanger 524A-524B, and an indoor fan 522A-522B.

VRF system 500 may be controlled by an extremum-seeking controller 526 in order to drive a total power consumption 534 to an extremum. Extremum-seeking controller 526 can manipulate a sub-cooling temperature setpoint 528 using an extremum-seeking control technique and can provide sub-cooling temperature setpoint 528 to a bypass expansion valve controller 530. Bypass expansion valve controller 530 can operate bypass expansion valve 510 via a communication path 532 to drive the sub-cooling temperature of the refrigerant to the manipulated sub-cooling temperature setpoint 528.

Outdoor VRF unit 502 can operate various other components of outdoor VRF unit 502 (e.g., outdoor fan 506, compressor 514, etc.) to achieve the manipulated sub-cooling temperature setpoint 528. Total power consumption 534 results from the operation and includes the power consumption of outdoor fan 506 and compressor 514. In other embodiments, total power consumption 534 may include power consumptions of other components within outdoor VRF unit 502 in addition to or in place of the power consumptions of outdoor fan 506 and/or compressor 514.

Referring particularly to FIG. 5, in the cooling mode, hot refrigerant gas may enter heat exchanger 504 and can be cooled by moving outdoor air over heat exchanger 504 using outdoor fan 506. The refrigerant may then pass through expansion valve 508 and can be transitioned (e.g., expanded) to a lower temperature, lower pressure state. A portion of the refrigerant may pass through the sub-cooling heat exchanger 512, whereas another portion of the refrigerant may bypass sub-cooling heat exchanger 512 through bypass expansion valve 510.

The sub-cooled refrigerant can be delivered to indoor VRF units 518A-518B. Within indoor VRF units 518A-518B, the refrigerant may pass through expansion valve 520A-520B to transition to a lower temperature, lower pressure state and subsequently through heat exchangers 524A-524B. Warmer indoor air can be cooled by moving air with indoor fans 522A-522B across heat exchangers 524A-524B.

The portion of the refrigerant that was sent through bypass expansion valve 510 can be routed back through sub-cooling heat exchanger 512 and then compressed in compressor 514 to a higher temperature, higher pressure state. The compressed refrigerant may then travel to junction 516 and can be combined with the refrigerant exiting indoor VRF units 518A-518B. The combined flow of refrigerant can be then sent back into outdoor VRF unit 502.

Referring particularly to FIG. 6, in the heating mode, liquid refrigerant may leave indoor VRF units 518A-518B and pass through sub-cooling heat exchanger 512. A portion of the refrigerant can be rerouted through bypass expansion valve 510 to transition to a lower temperature, lower pressure state, whereas another portion of the refrigerant can pass through expansion valve 508. The lower temperature, lower pressure refrigerant can be routed back through sub-cooling heat exchanger 512 and then compressed in compressor 514 to a higher temperature, higher pressure state.

The portion of the refrigerant that passes through expansion valve 508 can be transitioned to a lower temperature, lower pressure state and enter heat exchanger 504, where the refrigerant is warmed by moving outdoor air over heat exchanger 504 using outdoor fan 506. The refrigerant leaving heat exchanger 504 can be combined with the refrigerant leaving compressor 514 at junction 516. The combined refrigerant can be then sent to indoor VRF units 518A-518B.

Within indoor VRF units 518A-518B, the refrigerant may pass through heat exchangers 524A-524B. Cooler indoor air can be warmed by moving air with indoor fans 522A-522B across heat exchangers 524A-524B. The refrigerant may then pass through expansion valves 520A-520B to transition to a lower temperature, lower pressure state before leaving indoor VRF units 518A-518B.

Figure 7:
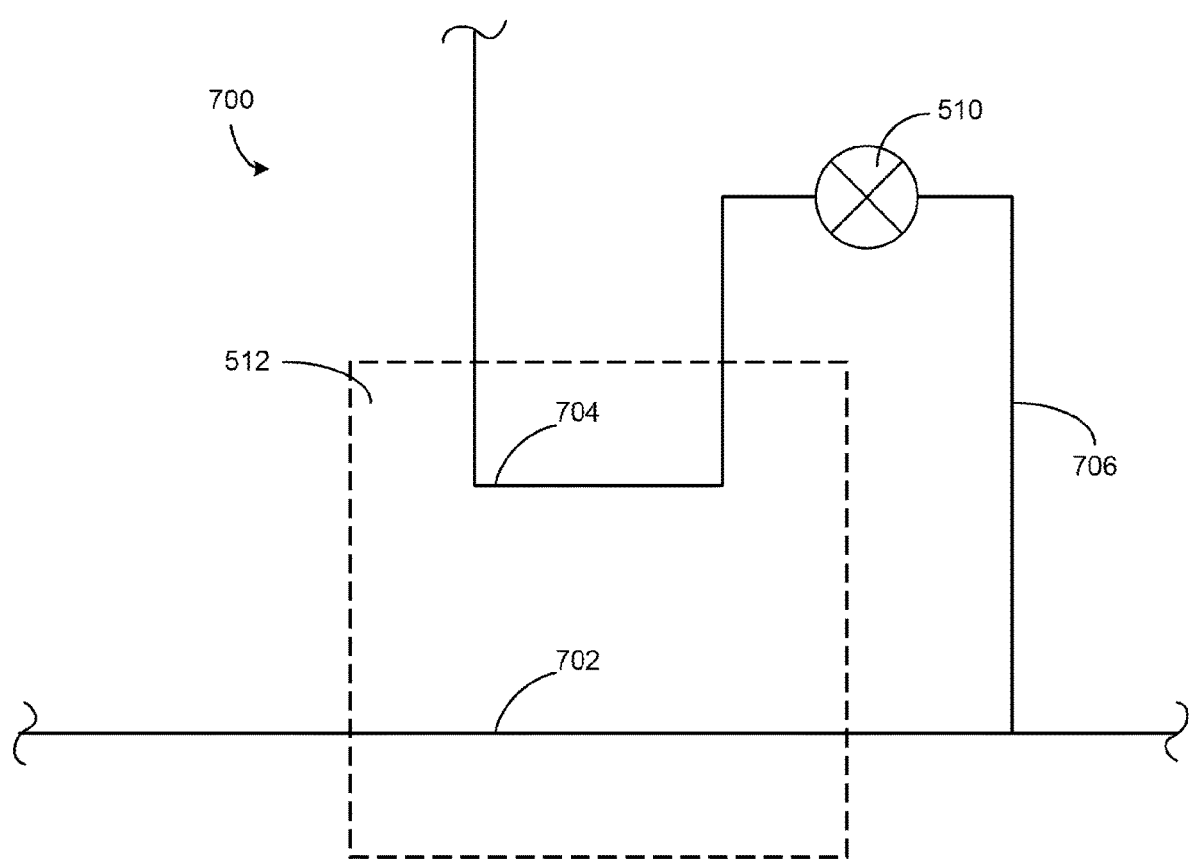
FIG. 7 is a block diagram illustrating a sub-cooler of the VRF system of FIGS. 5-6 in greater detail, according to some embodiments.

Referring now to FIG. 7, a detailed view of a sub-cooler 700 of VRF system 1000 is shown, according to some embodiments. Sub-cooler 700 is shown to include a first flow path 702, a second flow path 704, sub-cooling heat exchanger 512, a bypass line 706, and bypass expansion valve 510.

Sub-cooler 700 may operate similarly in both the cooling mode and the heating mode of VRF system 500. For example, refrigerant may branch off of first flow path 702 via bypass line 706. Flow through bypass line 706 into second flow path 704 can be regulated via bypass expansion valve 510. First flow path 702 and second flow path 704 may both pass through sub-cooling heat exchanger 512.

Refrigerant that passes through bypass expansion valve 510 into second flow path 704 may be at a lower temperature, lower pressure state than the refrigerant from first flow path 702. Heat may be transferred from first flow path 702 to second flow path 704 via sub-cooling heat exchanger 512. As a result, the refrigerant leaving sub-cooling heat exchanger 512 in first flow path 702 may be at a sub-cooled temperature.

Figure 8:
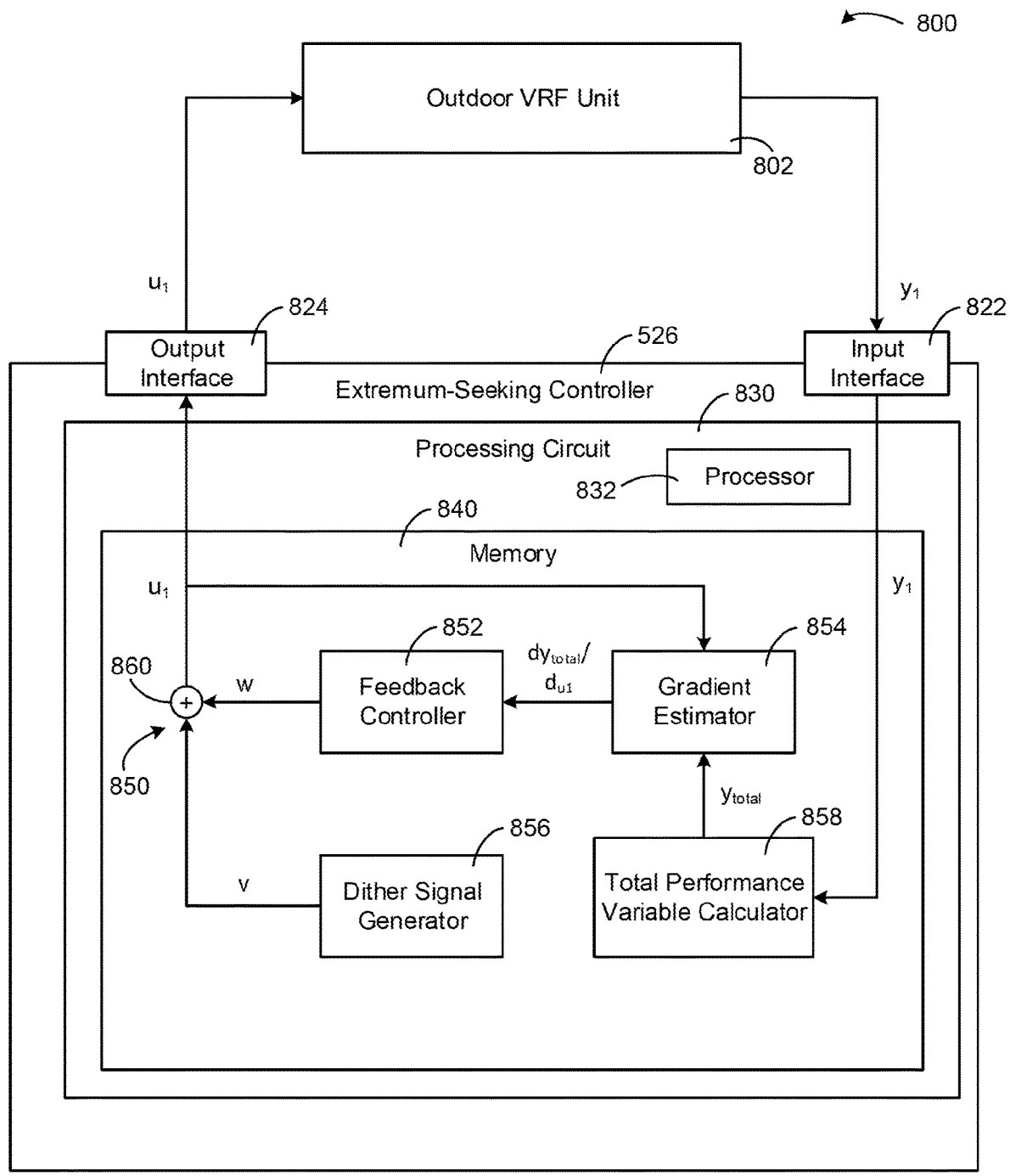
FIG. 8 is a block diagram of an ESC system for the VRF system of FIGS. 5-7, according to some embodiments.

Referring now to FIG. 8, a block diagram of an extremum-seeking control (ESC) system 800 for VRF system 1000 is shown, according to some embodiments. ESC system 800 is shown to include at least one outdoor VRF unit 502 and an extremum-seeking controller 526. Controller 526 is shown receiving a performance variable $y_1$ as feedback from outdoor VRF unit 502 via input interface 822 and providing a control input $u_1$ to outdoor VRF unit 502 via output interface 824. In some embodiments, the performance variable $y_1$ is total power consumption 534 and the control input $u_1$ is sub-cooling temperature setpoint 528. In other embodiments, controller 526 may receive one or more additional performance variables (i.e., $y_2 \ldots y_N$) in addition to $y_1$. For example, each of the performance variables $y_1$, $y_2, \ldots y_N$ may represent the power consumption of a particular component of outdoor VRF unit 502 (e.g., outdoor fan power consumption, compressor power consumption, etc.).

Controller 526 is shown to include total performance variable calculator 858 that may sum all of the individual performance variables for the overall system to obtain a total performance variable $y_{total}$ (e.g., $y_{total} = y_1 + y_2 \ldots y_N$). Controller 526 may operate in a manner similar to controllers 302 and 402, as described with reference to FIGS. 3-4. For example, controller 526 can use an extremum-seeking control (ESC) strategy to optimize the performance variable $y_{total}$. Controller 526 may perturb the control input $u_1$ with a periodic dither signal v. Controller 526 can adjust the control input $u_1$ to drive the gradient of performance variable $y_{total}$ to zero. In this way, controller 526 identifies values for control input $u_1$ that achieve an optimal value (e.g., a maximum or a minimum) for a total system performance variable $y_{total}$.

In some embodiments, the ESC logic implemented by controller 526 generates values for control input $u_1$ based on a received control signal (e.g., a setpoint, an operating mode signal, etc.). The control signal may be received from a user control (e.g., a thermostat, a local user interface, etc.), client devices (e.g., computer terminals, mobile user devices, cellular phones, laptops, tablets, desktop computers, etc.), a supervisory controller, or any other external system or device. In various embodiments, controller 526 can communicate with external systems and devices directly (e.g., using NFC, Bluetooth, Wi-Fi direct, cables, etc.) or via a communications network (e.g., a BACnet network, a LonWorks network, a LAN, a WAN, the Internet, a cellular network, etc.) using wired or wireless electronic data communications.

Still referring to FIG. 8, controller 526 is shown to include a communications interface including an input interface 822 and an output interface 824. For example, input interface 822 can be configured to receive an analog feedback signal (e.g., an output variable, a measured signal, a sensor output, a controlled variable) from outdoor VRF unit 502. Output interface 824 can be a digital output (e.g., an optical digital interface) configured to provide a digital control signal (e.g., a manipulated variable, a control input) to outdoor VRF unit 502. In other embodiments, output interface 824 is configured to provide an analog output signal.

Controller 526 is shown to include a processing circuit 830 having a processor 832 and memory 840. Processor 832 can be a general purpose or specific purpose processor, an application specific integrated circuit (ASIC), one or more field programmable gate arrays (FPGAs), a group of processing components, or other suitable processing components. Processor 832 is configured to execute computer code or instructions stored in memory 840 or received from other computer readable media (e.g., CD-ROM, network storage, a remote server, etc.).

Memory 840 can include one or more devices (e.g., memory units, memory devices, storage devices, etc.) for storing data and/or computer code for completing and/or facilitating the various processes described in the present disclosure. Memory 840 can include random access memory (RAM), read-only memory (ROM), hard drive storage, temporary storage, non-volatile memory, flash memory, optical memory, or any other suitable memory for storing software objects and/or computer instructions. Memory 840 can include database components, object code components, script components, or any other type of information structure for supporting the various activities and information structures described in the present disclosure. Memory 840 can be communicably connected to processor 832 via processing circuit 830 and can include computer code for executing (e.g., by processor 832) one or more processes described herein.

Still referring to FIG. 8, extremum-seeking controller 526 is shown receiving performance variable $y_1$ via input interface 822 and providing performance variable $y_1$ (and any other performance variables received via input interface 822) to total performance variable calculator 858. Total performance variable calculator 858 can add all of the performance variables received in order to provide a total performance variable $y_{total}$ to control loop 850 within controller 526. Control loop 850 is shown to include a gradient estimator 854, a feedback controller 852, and an excitation signal element 860. Gradient estimator 854 may be configured to determine the gradient $$\frac{dy_{total}}{du_1}$$

of the performance variable $y_{total}$ with respect to the control input $u_1$. Feedback controller 852 can be configured to adjust the DC value of the control input $u_1$ (i.e., the variable w) to drive the gradient $$\frac{dy_{total}}{du_1}$$

to zero. A dither signal generator 856 is shown to produce the dither signal used to perturb control input $u_1$ at excitation signal element 860.

Figure 9:
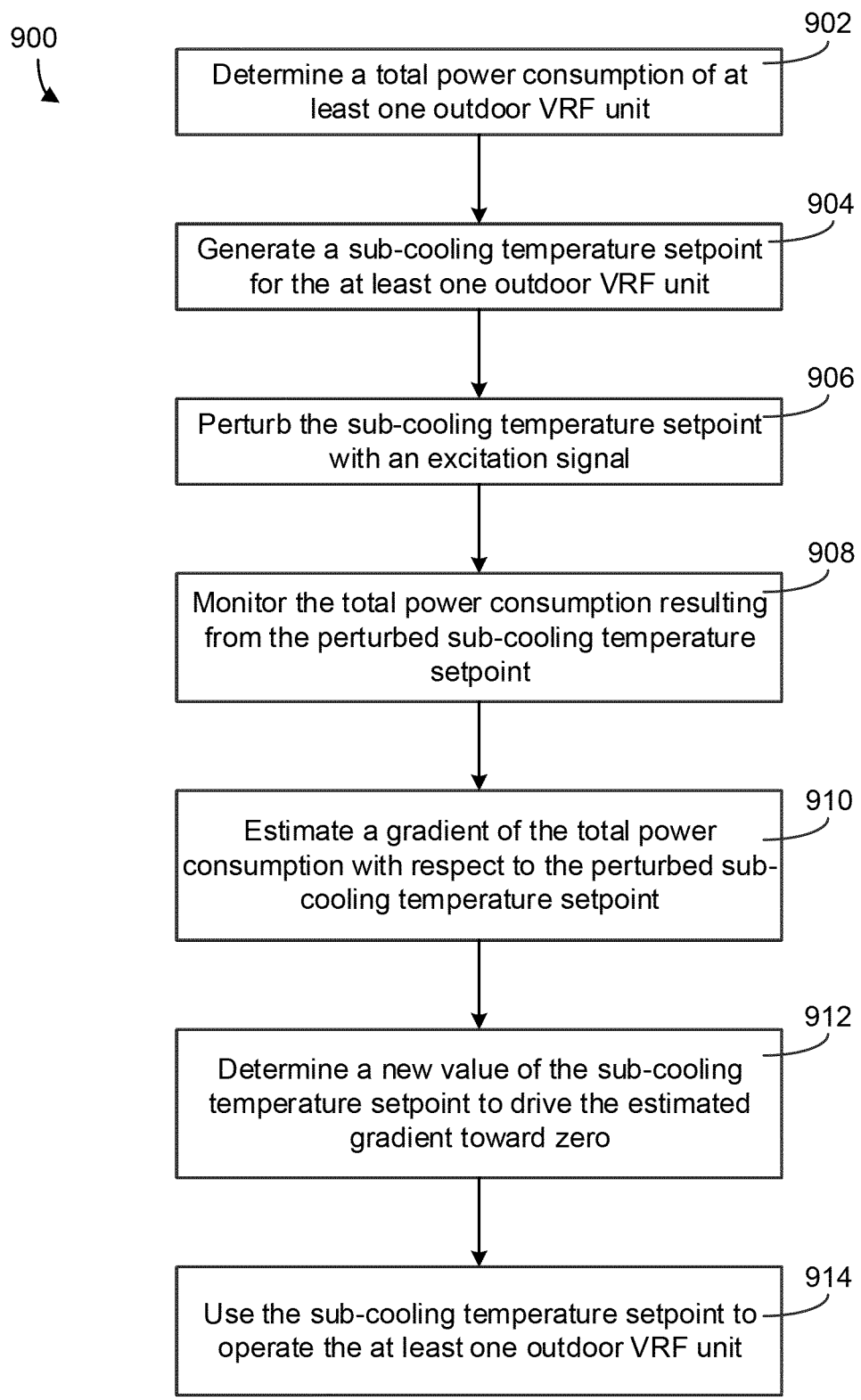
FIG. 9 is a flow chart of a process for operating the ESC system of FIG. 8 to control the VRF system of FIGS. 5-7, according to some embodiments.

Referring now to FIG. 9, a flow diagram of a process 900 for operating a VRF system using an extremum-seeking control (ESC) technique is shown, according to some embodiments. The ESC technique shown in flow diagram 900 can be performed by one or more components of an extremum-seeking controller (e.g., controller 526) to monitor and control a plant (e.g., VRF system 1000, outdoor VRF unit 502, etc.). For example, controller 526 can use an ESC technique to determine an optimal value of a control input $u_1$ provided to outdoor VRF unit 526 by perturbing the control input $u_1$ with a periodic dither signal v.

Process 900 is shown to include determining a total power consumption of at least one outdoor VRF unit (step 902). In some embodiments, determining the total power consumption can be receiving a singular input of the total power consumption. In other embodiments, the total power consumption may need to be calculated based on multiple power consumptions received as inputs.

Process 900 is shown to include generating a sub-cooling temperature setpoint for the at least one outdoor VRF unit (step 904), perturbing the sub-cooling temperature setpoint with an excitation signal (step 906), and monitoring the total power consumption resulting from the perturbed sub-cooling temperature setpoint (step 908). In some embodiments, the excitation signal is the dither signal v. The dither signal v can be generated by dither signal generator 856, as described with reference to FIG. 8. The dither signal v can be added to the sub-cooling temperature setpoint (e.g., DC value w) generated by the feedback controller to form the perturbed sub-cooling temperature setpoint. In some embodiments, the perturbed sub-cooling temperature setpoint is the new control input $u_1$ (e.g., $u_1$=w+v). After the new control input $u_1$ is generated, it can be provided to the plant (e.g., outdoor VRF unit 502) and the ESC control technique can be repeated. In some instances, the addition of dither signal v causes the control input $u_1$ to drift away from its optimum value. However, the feedback controller can compensate for such drift by adjusting the DC value w such that the control input $u_1$ is continuously pulled back toward its optimum value. The magnitude and frequency of the dither signal v can be selected (e.g., manually by a user or automatically by the controller) to overcome any additive noise found in the performance variable $y_{total}$ (e.g., process noise, measurement noise, etc.).

Process 900 is shown to include estimating a gradient of the total power consumption with respect to the perturbed sub-cooling temperature setpoint (step 910). In some embodiments, the total power consumption is the total performance variable $y_{total}$. In some embodiments, the gradient is the performance gradient p described with reference to FIG. 4. In other embodiments, the gradient can also be the performance gradient $$\frac{dy_{total}}{du_1}.$$

For example, the gradient can be a slope or derivative of a curve defined by the function $y_{total}=f(u_1)$ at a particular location along the curve (e.g., at a particular value of $u_1$). The gradient can be estimated using one or more pairs of values for the control input $u_1$ and the performance variable $y_{total}$.

Still referring to FIG. 9, process 900 is shown to include determining a new value of the sub-cooling temperature setpoint to drive the estimated gradient toward zero (step 912) and using the sub-cooling temperature setpoint to operate the at least one outdoor VRF unit (step 914). In some embodiments, step 912 is performed by feedback controller 852 shown in FIG. 8. The feedback controller can receive the estimated gradient as an input and can modulate its output (e.g., DC output w) to drive the estimated gradient toward zero. The feedback controller can increase or decrease the value of the DC output w until an optimum value for the DC output w is reached. The optimum value of the DC output w can be defined as the value which results in an optimum value (e.g., a maximum or minimum value) of the performance variable $y_{total}$. The optimum value of the performance variable $y_{total}$ occurs when the gradient is zero. Accordingly, the feedback controller can achieve the optimum value of the performance variable $y_{total}$ by modulating its output w to drive the gradient to zero.

Variable Refrigerant Flow System with Pressure Optimization

Figure 10:
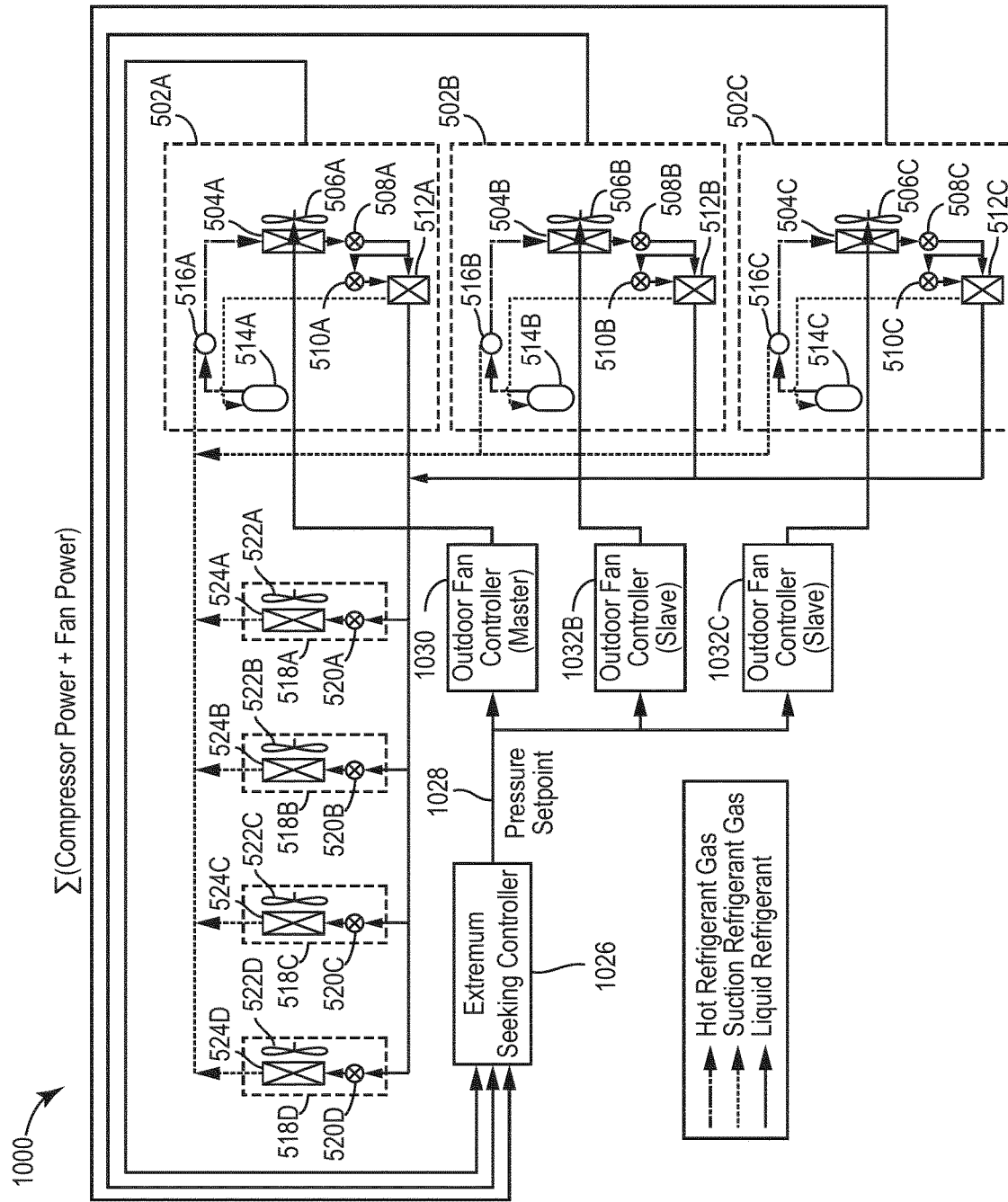
FIG. 10 is a schematic of a VRF system with multiple outdoor VRF units in a cooling configuration, according to some embodiments.
Figure 11:
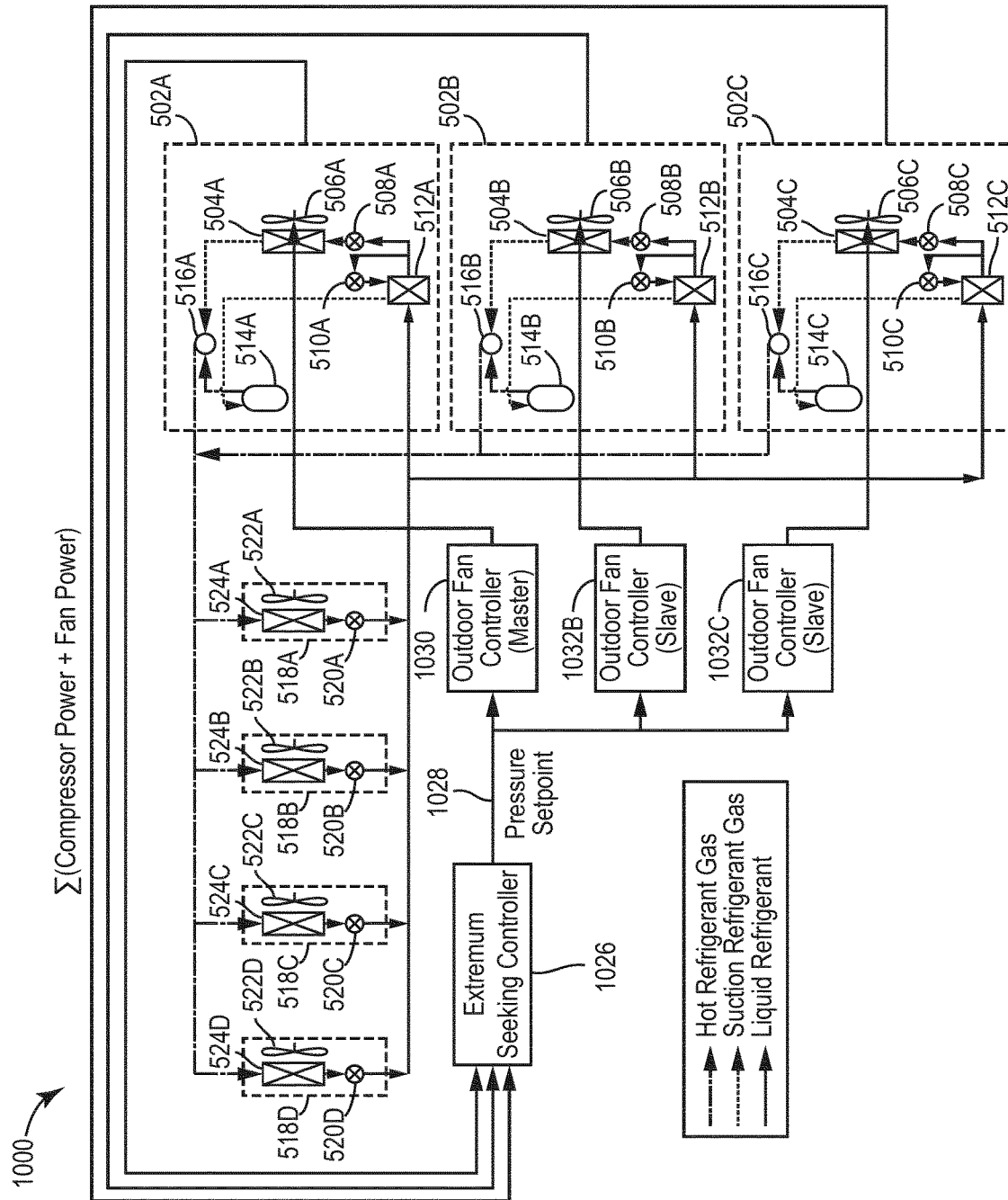
FIG. 11 is a schematic of the VRF system of FIG. 10 with the multiple outdoor VRF units in a heating configuration, according to some embodiments.

Referring now to FIGS. 10-11, a variable refrigerant flow (VRF) system 1000 is shown, according to some embodiments. FIG. 10 illustrates the operation of VRF system 1000 in a cooling mode, whereas FIG. 11 illustrates the operation of VRF system 1000 in a heating mode. VRF system 1000 can be configured to cool a building by cooling a refrigerant with an outdoor VRF units 502A-502C and delivering the refrigerant to a plurality of indoor units 518A-518D. VRF system 500 can be configured to heat a building by heating a refrigerant with outdoor VRF units 502A-502C and deliver the refrigerant to indoor units 518A-518D. Although only three outdoor VRF units 502A-502C and four indoor VRF units 518A-518D are shown in FIGS. 10-11, it should be understood that VRF system 1000 may include more than three outdoor VRF units 502A-502C and more than four indoor VRF units 518A-518D in various exemplary embodiments.

Outdoor VRF units 502A-502C are shown to include heat exchangers 504A-504C, outdoor fans 506A-506C, expansion valves 508A-508C, bypass expansion valves 510A-510C, sub-cooling heat exchangers 512A-512C, compressors 514A-514C, and junctions 516A-516C. Indoor VRF units 518A-518D are shown to include expansion valves 520A-520D, heat exchangers 524A-524D, and indoor fans 522A-522D.

VRF system 1000 may be controlled by an extremum-seeking controller 1026 in order to drive a total power consumption to an extremum. Extremum-seeking controller 1026 can manipulate a pressure setpoint 1028 using an extremum-seeking control technique and can provide pressure setpoint 1028 to a master outdoor fan controller 1030. Pressure setpoint 1028 may be a discharge pressure setpoint when VRF system 1000 is in the cooling mode, and pressure setpoint 1028 may be a suction pressure setpoint when VRF system 1000 is in the heating mode. Master outdoor fan controller 1030 can operate outdoor fan 506A and communicate the control to slave outdoor fan controllers 1032B-1032C. Slave outdoor fan controllers 1032B-1032C can operate outdoor fans 506B-506C.

Outdoor VRF units 502A-502C can operate various other components of outdoor VRF units 502A-502C (e.g., outdoor fans 506A-506C, compressors 514A-514C, etc.) to achieve the manipulated pressure setpoint 1028. Total power consumption results from the operation and includes the power consumption of outdoor fans 506A-506C and compressors 514A-514C. In other embodiments, total power consumption may include power consumptions of other components within outdoor VRF units 502A-502C in addition to or in place of the power consumptions of outdoor fans 506A-506C and/or compressors 514A-514C.

Referring particularly to FIG. 10, in the cooling mode, hot refrigerant gas may enter heat exchangers 504A-504C and can be cooled by moving outdoor air over heat exchangers 504A-504C using outdoor fans 506A-506C. The refrigerant may then pass through expansion valves 508A-508C and can be transitioned (e.g., expanded) to a lower temperature, lower pressure state. A portion of the refrigerant may pass through the sub-cooling heat exchangers 512A-512C, whereas another portion of the refrigerant may bypass sub-cooling heat exchangers 512A-512C through bypass expansion valves 510A-510C.

The sub-cooled refrigerant can be delivered to indoor VRF units 518A-518D. Within indoor VRF units 518A-518D, the refrigerant may pass through expansion valves 520A-520D to transition to a lower temperature, lower pressure state and subsequently through heat exchangers 524A-524D. Warmer indoor air can be cooled by moving air with indoor fans 522A-522D across heat exchangers 524A-524D.

The portion of the refrigerant that was sent through bypass expansion valves 510A-510C can be routed back through sub-cooling heat exchangers 512A-512C and then compressed in compressors 514A-514C to a higher temperature, higher pressure state. The compressed refrigerant may then travel to junctions 516A-516C and can be combined with the refrigerant exiting indoor VRF units 518A-518D. The combined flow of refrigerant can be then sent back into outdoor VRF units 502A-502C.

Referring particularly to FIG. 11, in the heating mode, liquid refrigerant may leave indoor VRF units 518A-518D and pass through sub-cooling heat exchangers 512A-512C. A portion of the refrigerant can be rerouted through bypass expansion valves 510A-510C to transition to a lower temperature, lower pressure state, whereas another portion of the refrigerant can pass through expansion valves 508A-508C. The lower temperature, lower pressure refrigerant can be routed back through sub-cooling heat exchangers 512A-512C and then compressed in compressors 514A-514C to a higher temperature, higher pressure state.

The portion of the refrigerant that passes through expansion valves 508A-508C can be transitioned to a lower temperature, lower pressure state and enter heat exchangers 504A-504C, where the refrigerant is warmed by moving outdoor air over heat exchangers 504A-504C using outdoor fans 506A-506C. The refrigerant leaving heat exchangers 504A-504C can be combined with the refrigerant leaving compressors 514A-514C at junctions 516A-516C. The combined refrigerant can be then sent to indoor VRF units 518A-518D.

Within indoor VRF units 518A-518D, the refrigerant may pass through heat exchangers 524A-524D. Cooler indoor air can be warmed by moving air with indoor fans 522A-522D across heat exchangers 524A-524D. The refrigerant may then pass through expansion valves 520A-520D to transition to a lower temperature, lower pressure state before leaving indoor VRF units 518A-518D.

Figure 12:
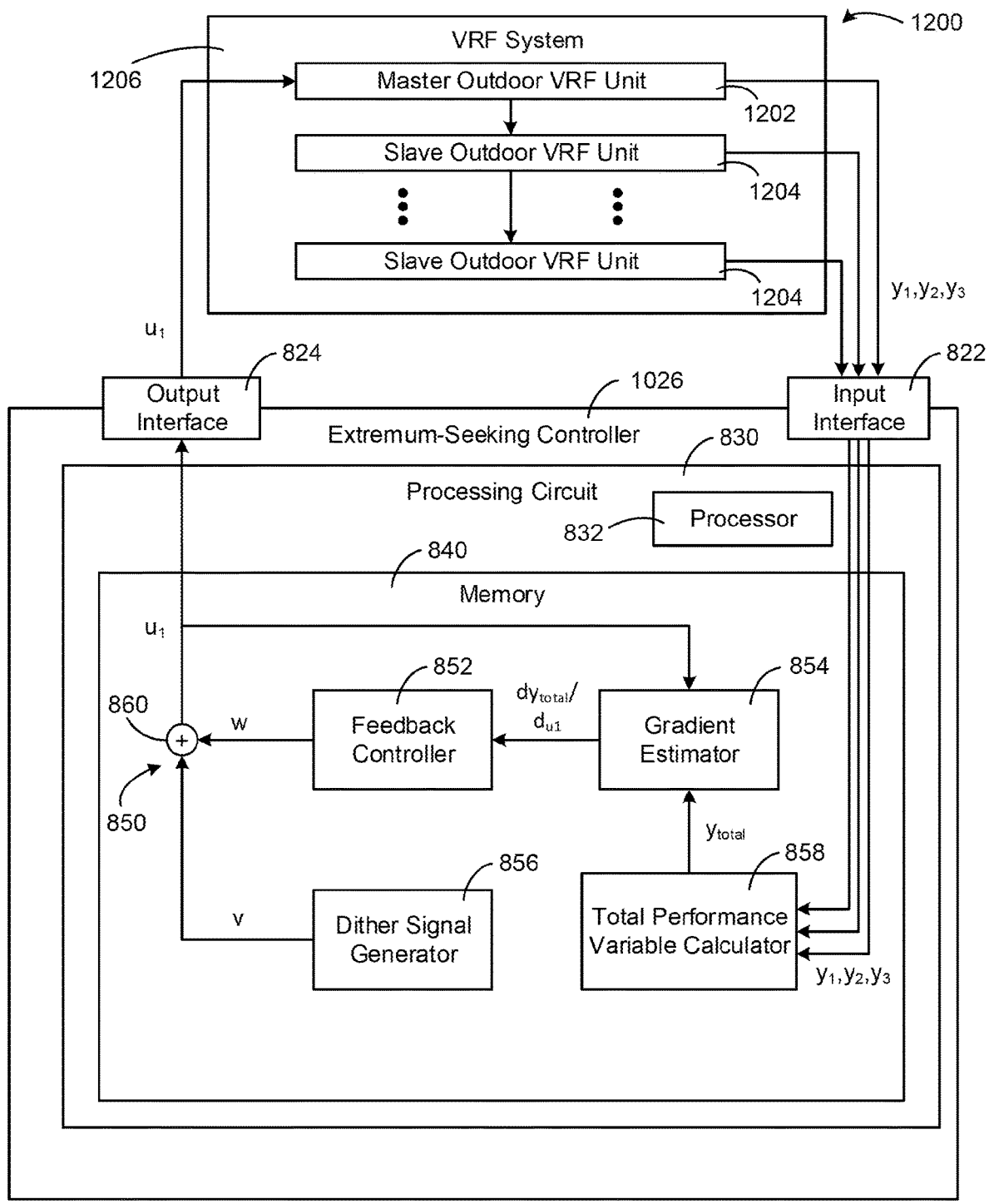
FIG. 12 is a block diagram of an ESC system for the VRF system of FIGS. 10-11, according to some embodiments.

Referring now to FIG. 12, a block diagram of an extremum-seeking control (ESC) system 1200 for VRF system 1000 is shown, according to some embodiments. ESC system 1200 is shown to include a VRF system 1206, comprising a master outdoor VRF unit 1202 and at least one slave outdoor VRF unit 1204, and an extremum-seeking controller 1026. Controller 1026 is shown receiving a performance variable $y_1$ as feedback from VRF system 1206 via input interface 822 and providing a control input $u_1$ to VRF system 1206 via output interface 824. In some embodiments, the performance variable $y_1$ is total power consumption 534 and the control input $u_1$ is pressure setpoint 1028. In other embodiments, controller 1026 may receive one or more additional performance variables (i.e., $y_2 \ldots y_N$) in addition to $y_1$. For example, each of the performance variables $y_1$, $y_2, \ldots y_N$ may represent the power consumption of a particular component of VRF system 1206 (e.g., outdoor fan power consumption, compressor power consumption, etc.).

Controller 1026 is shown to include total performance variable calculator 858 that may sum all of the individual performance variables for the overall system to obtain a total performance variable $y_{total}$ (e.g., $y_{total}=y_1+y_2 \ldots y_N$). Controller 1026 may operate in a manner similar to controllers 302 and 402, as described with reference to FIGS. 3-4. For example, controller 1026 can use an extremum-seeking control (ESC) strategy to optimize the performance variable $y_{total}$. Controller 1026 may perturb the control input $u_1$ with a periodic dither signal v. Controller 1026 can adjust the control input $u_1$ to drive the gradient of performance variable $y_{total}$ to zero. In this way, controller 1026 identifies values for control input $u_1$ that achieve an optimal value (e.g., a maximum or a minimum) for a total system performance variable $y_{total}$.

In some embodiments, the ESC logic implemented by controller 1026 generates values for control input $u_1$ based on a received control signal (e.g., a setpoint, an operating mode signal, etc.). The control signal may be received from a user control (e.g., a thermostat, a local user interface, etc.), client devices (e.g., computer terminals, mobile user devices, cellular phones, laptops, tablets, desktop computers, etc.), a supervisory controller, or any other external system or device. In various embodiments, controller 1026 can communicate with external systems and devices directly (e.g., using NFC, Bluetooth, Wi-Fi direct, cables, etc.) or via a communications network (e.g., a BACnet network, a LonWorks network, a LAN, a WAN, the Internet, a cellular network, etc.) using wired or wireless electronic data communications.

Still referring to FIG. 12, controller 1026 is shown to include a communications interface including an input interface 822 and an output interface 824. For example, input interface 822 can be configured to receive an analog feedback signal (e.g., an output variable, a measured signal, a sensor output, a controlled variable) from VRF system 1206. Output interface 824 can be a digital output (e.g., an optical digital interface) configured to provide a digital control signal (e.g., a manipulated variable, a control input) to VRF system 1206. In other embodiments, output interface 824 is configured to provide an analog output signal.

Controller 1026 is shown to include a processing circuit 830 having a processor 832 and memory 840. Processor 832 can be a general purpose or specific purpose processor, an application specific integrated circuit (ASIC), one or more field programmable gate arrays (FPGAs), a group of processing components, or other suitable processing components. Processor 832 is configured to execute computer code or instructions stored in memory 840 or received from other computer readable media (e.g., CD-ROM, network storage, a remote server, etc.).

Memory 840 can include one or more devices (e.g., memory units, memory devices, storage devices, etc.) for storing data and/or computer code for completing and/or facilitating the various processes described in the present disclosure. Memory 840 can include random access memory (RAM), read-only memory (ROM), hard drive storage, temporary storage, non-volatile memory, flash memory, optical memory, or any other suitable memory for storing software objects and/or computer instructions. Memory 840 can include database components, object code components, script components, or any other type of information structure for supporting the various activities and information structures described in the present disclosure. Memory 840 can be communicably connected to processor 832 via processing circuit 830 and can include computer code for executing (e.g., by processor 832) one or more processes described herein.

Still referring to FIG. 12, extremum-seeking controller 1026 is shown receiving performance variable $y_1$ via input interface 822 and providing performance variable $y_1$ (and any other performance variables received via input interface 822) to total performance variable calculator 858. Total performance variable calculator 858 can add all of the performance variables received in order to provide a total performance variable $y_{total}$ to control loop 850 within controller 1026. Control loop 850 is shown to include a gradient estimator 854, a feedback controller 852, and an excitation signal element 860. Gradient estimator 854 may be configured to determine the gradient $$\frac{dy_{total}}{du_1}$$

of the performance variable $y_{total}$ with respect to the control input $u_1$. Feedback controller 852 can be configured to adjust the DC value of the control input $u_1$ (i.e., the variable w) to drive the gradient $$\frac{dy_{total}}{du_1}$$

to zero. A dither signal generator 856 is shown to produce the dither signal used to perturb control input $u_1$ at excitation signal element 860.

Figure 13:
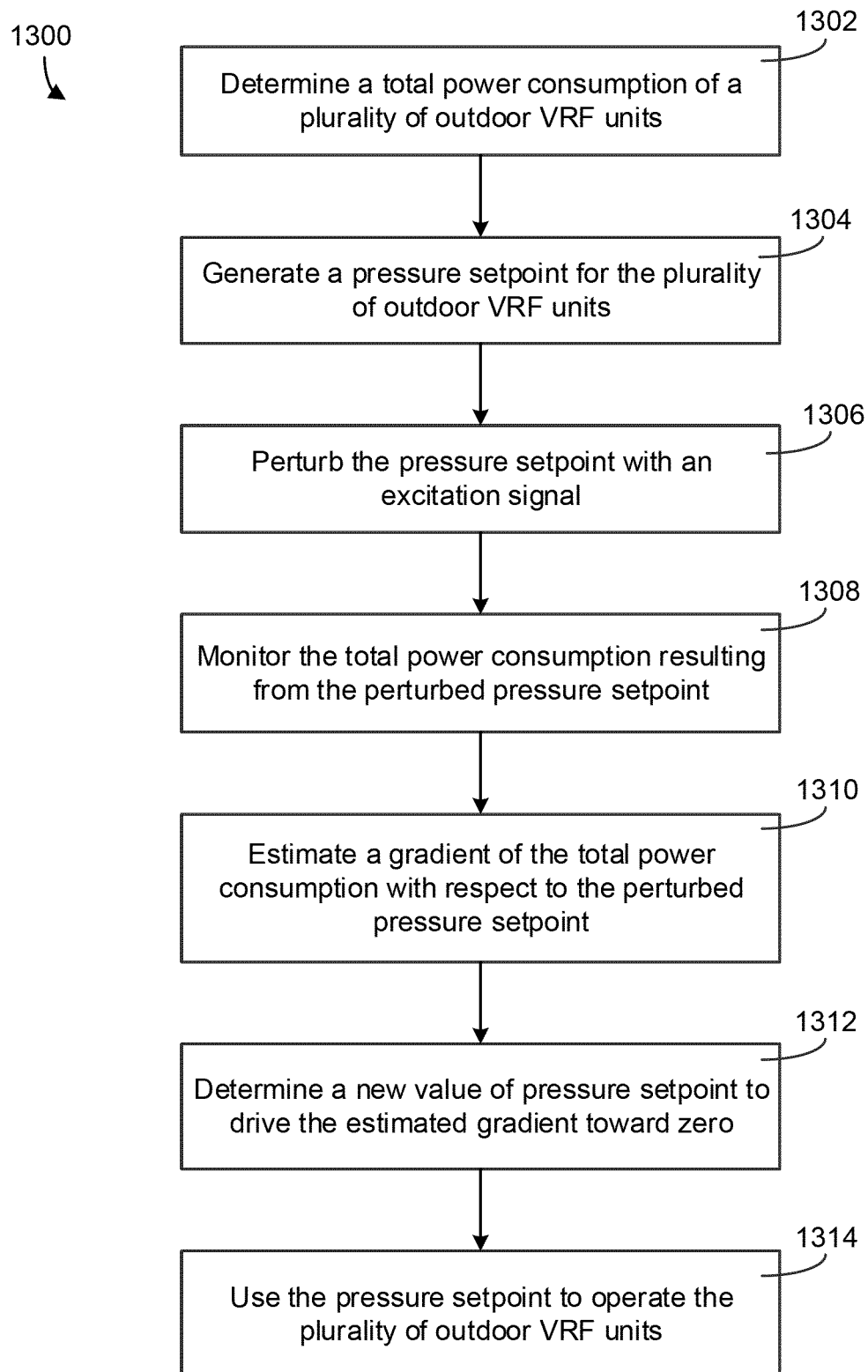
FIG. 13 is a flow chart of a process for operating the ESC system of FIG. 12 to control VRF system of FIGS. 10-12, according to some embodiments.

Referring now to FIG. 13, a flow diagram of a process 1300 for operating a VRF system using an extremum-seeking control (ESC) technique is shown, according to some embodiments. The ESC technique shown in flow diagram 1300 can be performed by one or more components of an extremum-seeking controller (e.g., controller 1026) to monitor and control a plant (e.g., VRF system 1000, VRF system 1206, etc.). For example, controller 1026 can use an ESC technique to determine an optimal value of a control input $u_1$ provided to VRF system 1206 by perturbing the control input $u_1$ with a periodic dither signal v.

Process 1300 is shown to include determining a total power consumption of plurality of VRF units (step 1302). In some embodiments, determining the total power consumption can be receiving a singular input of the total power consumption. In other embodiments, the total power consumption may need to be calculated based on multiple power consumptions received as inputs.

Process 1300 is shown to include generating a pressure setpoint for the plurality of outdoor VRF units (step 1304), perturbing the pressure setpoint with an excitation signal (step 1306), and monitoring the total power consumption resulting from the perturbed pressure setpoint (step 908). In some embodiments, the excitation signal is the dither signal v. The dither signal v can be generated by dither signal generator 856, as described with reference to FIG. 12. The dither signal v can be added to the sub-cooling temperature setpoint (e.g., DC value w) generated by the feedback controller to form the perturbed sub-cooling temperature setpoint. In some embodiments, the perturbed sub-cooling temperature setpoint is the new control input $u_1$ (e.g., $u_1$=w+ v). After the new control input $u_1$ is generated, it can be provided to the plant (e.g., VRF system 1206) and the ESC control technique can be repeated. In some instances, the addition of dither signal v causes the control input $u_1$ to drift away from its optimum value. However, the feedback controller can compensate for such drift by adjusting the DC value w such that the control input $u_1$ is continuously pulled back toward its optimum value. The magnitude and frequency of the dither signal v can be selected (e.g., manually by a user or automatically by the controller) to overcome any additive noise found in the performance variable $y_{total}$ (e.g., process noise, measurement noise, etc.).

Process 1300 is shown to include estimating a gradient of the total power consumption with respect to the perturbed pressure setpoint (step 1310). In some embodiments, the total power consumption is the total performance variable $y_{total}$. In some embodiments, the gradient is the performance gradient p described with reference to FIG. 4. In other embodiments, the gradient can also be the performance gradient $$\frac{dy_{total}}{du_1}.$$

For example, the gradient can be a slope or derivative of a curve defined by the function $y_{total}$=f($u_1$) at a particular location along the curve (e.g., at a particular value of $u_1$). The gradient can be estimated using one or more pairs of values for the control input $u_1$ and the performance variable $y_{total}$.

Still referring to FIG. 13, process 1300 is shown to include determining a new value of the pressure setpoint to drive the estimated gradient toward zero (step 1312) and using the pressure setpoint to operate the at least one outdoor VRF unit (step 1314). In some embodiments, step 1312 is performed by feedback controller 852 shown in FIG. 12 The feedback controller can receive the estimated gradient as an input and can modulate its output (e.g., DC output w) to drive the estimated gradient toward zero. The feedback controller can increase or decrease the value of the DC output w until an optimum value for the DC output w is reached. The optimum value of the DC output w can be defined as the value which results in an optimum value (e.g., a maximum or minimum value) of the performance variable $y_{total}$. The optimum value of the performance variable $y_{total}$ occurs when the gradient is zero. Accordingly, the feedback controller can achieve the optimum value of the performance variable $y_{total}$ by modulating its output w to drive the gradient to zero.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can include RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A variable refrigerant flow (VRF) system for a building, the VRF system comprising:
at least one outdoor VRF unit configured to heat or cool a refrigerant for use in heating or cooling the building, the at least one outdoor VRF unit comprising a sub-cooler and a bypass expansion valve configured to control a flow of the refrigerant through the sub-cooler; and an extremum-seeking controller configured to generate a sub-cooling temperature setpoint for the at least one outdoor VRF unit by:

determining a total power consumption of the at least one outdoor VRF unit;

generating the sub-cooling temperature setpoint for the at least one outdoor VRF unit using an extremum-seeking control technique that drives the total power consumption toward an extremum; and using the sub-cooling temperature setpoint to operate the at least one outdoor VRF unit, wherein generating the sub-cooling temperature setpoint for the at least one outdoor VRF unit using an extremum-seeking control technique comprises:

perturbing a current value of the sub-cooling temperature setpoint with an excitation signal;

monitoring the total power consumption resulting from the perturbed current value of the sub-cooling temperature setpoint;

estimating a gradient of the total power consumption with respect to the perturbed current value of the sub-cooling temperature setpoint; and determining a new value of the sub-cooling temperature setpoint to drive the estimated gradient toward zero.

2. The VRF system of claim 1, wherein perturbing the current value of the sub-cooling temperature setpoint with an excitation signal comprises adding a dither signal.

3. The VRF system of claim 1, wherein the total power consumption comprises a combination of a compressor power and a fan power for the at least one outdoor VRF unit.

4. The VRF system of claim 1, wherein the at least one outdoor VRF unit is configured to deliver the refrigerant to a plurality of indoor VRF units located within the building.

5. The VRF system of claim 1, wherein the sub-cooling temperature setpoint is a setpoint temperature for a portion of the refrigerant that is cooled in the sub-cooler at an outlet of the sub-cooler.

6. The VRF system of claim 1, wherein the sub-cooling temperature setpoint is a setpoint temperature difference between a temperature of the portion of the refrigerant that is cooled in the sub-cooler at an outlet of the sub-cooler and a saturation temperature of the portion of the refrigerant that is cooled in the sub-cooler at the outlet of the sub-cooler.

7. The VRF system of claim 1, wherein the sub-cooler comprises:

a first flow path and a second flow path configured to pass through a heat exchanger;

a bypass line configured to branch off of the first flow path and provide refrigerant to the second flow path; and the bypass expansion valve located between the bypass line and the second flow path configured to control the flow from the bypass line into the second flow path.

8. The VRF system of claim 7, wherein the heat exchanger of the sub-cooler is configured to transfer heat from the portion of the refrigerant in the first flow path to the portion of the refrigerant in the second flow path.

9. A method for operating a variable refrigerant flow (VRF) system for a building, the method comprising:

determining a total power consumption of at least one outdoor VRF unit;

generating a sub-cooling temperature setpoint for the at least one outdoor VRF unit using an extremum-seeking control technique that drives the total power consumption toward an extremum; and using the sub-cooling temperature setpoint to operate the at least one outdoor VRF unit, wherein generating the sub-cooling temperature setpoint for the at least one outdoor VRF unit using the extremum-seeking control technique comprises:

perturbing a current value of the sub-cooling temperature setpoint with an excitation signal;

monitoring the total power consumption resulting from the perturbed current value of the sub-cooling temperature setpoint;

estimating a gradient of the total power consumption with respect to the perturbed current value of the sub-cooling temperature setpoint; and determining a new value of the sub-cooling temperature setpoint to drive the estimated gradient toward zero.

10. The method of claim 9, wherein perturbing the current value of the sub-cooling temperature setpoint with an excitation signal comprises adding a dither signal.

11. The method of claim 9, wherein the at least one outdoor VRF unit comprises a compressor and a fan, wherein determining the total power consumption of the at least one outdoor VRF unit comprise combining a power consumption of the compressor and a power consumption of the fan for at least one of outdoor VRF units.

12. The method of claim 9, further comprising:

operating the at least one outdoor VRF unit to heat or cool a refrigerant; and delivering the refrigerant to a plurality of indoor VRF units located within the building.

13. The method of claim 9, further comprising setting the sub-cooling temperature setpoint to a setpoint temperature for the portion of the refrigerant that is cooled in a sub-cooler at an outlet of the sub-cooler.

14. The method of claim 9, further comprising setting the sub-cooling temperature setpoint to a setpoint temperature difference between a temperature of the portion of the refrigerant that is cooled in a sub-cooler at an outlet of the sub-cooler and a saturation temperature of the portion of the refrigerant that is cooled in the sub-cooler at an outlet of the sub-cooler.

15. The method of claim 9, wherein a sub cooler comprises a first flow path, a second flow path, a heat exchanger, a bypass line, and a bypass expansion valve, the method further comprising:

directing refrigerant through the first flow path and the second flow path to pass through the heat exchanger;

branching the bypass line off of the first flow path to provide refrigerant to the second flow path; and controlling the bypass expansion valve located between the bypass line and the second flow path to control flow from the bypass line into the second flow path.

16. The method of claim 15, further comprising transferring heat from the portion of the refrigerant in the first flow path to the portion of the refrigerant in the second flow path.

17. An extremum-seeking controller apparatus for a variable refrigerant flow (VRF) system for a building, the VRF system comprising at least one outdoor VRF unit configured to heat or cool a refrigerant for use in heating or cooling the building, the at least one outdoor VRF unit comprising a sub-cooler and a bypass expansion valve configured to control a flow of the refrigerant through the sub-cooler, the extremum-seeking controller apparatus comprising:

one or more interfaces configured to provide control signals to the VRF system; and a processing circuit configured to generate a sub-cooling temperature setpoint for the at least one outdoor VRF unit by:

determining a total power consumption of the at least one outdoor VRF unit;
generating a sub-cooling temperature setpoint for the at least one outdoor VRF unit using an extremum-seeking control technique that drives the total power consumption toward an extremum; and
using the sub-cooling temperature setpoint to operate the at least one outdoor VRF unit, wherein generating the sub-cooling temperature setpoint for the at least one outdoor VRF unit using the extremum-seeking control technique comprises:
  perturbing a current value of the sub-cooling temperature setpoint with an excitation signal;
  monitoring the total power consumption resulting from the perturbed current value of the sub-cooling temperature setpoint;
  estimating a gradient of the total power consumption with respect to the perturbed current value of the sub-cooling temperature setpoint; and
  determining a new value of the sub-cooling temperature setpoint to drive the estimated gradient toward zero.

18. The extremum-seeking controller apparatus of claim 17, wherein perturbing the current value of the sub-cooling temperature setpoint with an excitation signal comprises adding a dither signal.

19. The extremum-seeking controller apparatus of claim 17, wherein monitoring the total power consumption resulting from the perturbed current value of the sub-cooling temperature setpoint comprises combining a power consumption of a compressor and a power consumption of a fan for at least one outdoor VRF units.

20. The extremum-seeking controller apparatus of claim 17, wherein the one or more interfaces are further configured to receive data from the VRF system.

\* \* \* \* \*